United States Patent
Kapit et al.

(10) Patent No.: US 12,468,971 B2
(45) Date of Patent: Nov. 11, 2025

(54) TUNABLE CAPACITOR FOR SUPERCONDUCTING QUBITS

(71) Applicant: COLORADO SCHOOL OF MINES, Golden, CO (US)

(72) Inventors: Eliot Kapit, Golden, CO (US); Nicholas Materise, Golden, CO (US); Javad Shabani, New York City, NY (US)

(73) Assignee: Colorado School of Mines, Golden, CO (US)

( * ) Notice: Subject to any disclaimer, the term of this patent is extended or adjusted under 35 U.S.C. 154(b) by 896 days.

(21) Appl. No.: 17/564,789

(22) Filed: Dec. 29, 2021

(65) Prior Publication Data
US 2022/0207403 A1 Jun. 30, 2022

Related U.S. Application Data

(60) Provisional application No. 63/132,831, filed on Dec. 31, 2020.

(51) Int. Cl.
*G06N 10/40* (2022.01)
*H10N 60/85* (2023.01)

(52) U.S. Cl.
CPC .............. *G06N 10/40* (2022.01); *H10N 60/85* (2023.02)

(58) Field of Classification Search
CPC ................................ G06N 10/40; H10N 60/85
See application file for complete search history.

(56) References Cited

U.S. PATENT DOCUMENTS

| | | |
|---|---|---|
| 8,975,912 B2 | 3/2015 | Chow et al. |
| 12,204,997 B2 | 1/2025 | Reagor et al. |
| 2008/0313114 A1 | 12/2008 | Rose |
| 2012/0023053 A1 | 1/2012 | Harris et al. |
| 2018/0218279 A1 | 8/2018 | Lechner et al. |
| 2019/0266508 A1 | 8/2019 | Bunyk et al. |
| 2019/0305104 A1* | 10/2019 | Xie ........... H10D 62/121 |
| 2020/0227523 A1* | 7/2020 | Leipold ........ G06N 20/00 |
| 2021/0089954 A1 | 3/2021 | Kapit |
| 2021/0166148 A1 | 6/2021 | Matsuura et al. |

(Continued)

FOREIGN PATENT DOCUMENTS

| | | |
|---|---|---|
| WO | 2019084286 A1 | 5/2019 |
| WO | 2025111345 A1 | 5/2025 |

OTHER PUBLICATIONS

Abanin, et al. "Exponentially Slow Heating in Periodically Driven Many-Body Systems", Physical Review Letters 115, 256803 (2015), pp. 1-5.

(Continued)

*Primary Examiner* — Paul A Wartalowicz
(74) *Attorney, Agent, or Firm* — Dorsey & Whitney LLP

(57) ABSTRACT

An exemplary tundable capacitor in a quantum system includes a pair of qubits, and a capacitive coupling element coupled between the pair of qubits. The capacitive coupling element includes a plurality of gate terminals. The capacitive coupling element is configured to receive a respective gate voltage at each of the plurality of gate terminals and to adjust a capacitance of the capacitive coupling element in response to the respective gate voltage received at each of the plurality of gate terminals. The capacitance of the capacitive coupling element is configured to control a coupling strength between the pair of qubits.

19 Claims, 7 Drawing Sheets

(56) References Cited

U.S. PATENT DOCUMENTS

| | | |
|---|---|---|
| 2022/0292235 A1 | 9/2022 | Susa et al. |
| 2023/0409945 A1 | 12/2023 | Miller, Jr. |
| 2024/0013088 A1 | 1/2024 | Kapit et al. |

OTHER PUBLICATIONS

Abdelhafez et al., "Universal Gates for Protected Superconducting Qubits using Optimal Control", Physical Review A 101, 022321 (2020), p. 022321-1-022321-13.

Abrams et al, "Implementation of the XY Interaction Family with Calibration of a Single Pulse", arXiv preprint arXiv:1912.04424 (2019), pp. 1-13.

Albash et al., "Adiabatic Quantum Computing", arXiv:1611.04471v2 (2018).

Albash et al., "Demonstration of a Scaling Advantage for a Quantum Annealer over Simulated Annealing", Physical Review X 8, 031016 (2018), p. 031016-1-031016-26.

Albert et al. "Holonomic Quantum Control with Continuous Variable Systems", Phys. Rev. Lett. 116, 140502 (2016) pp. 1-6.

Albert et al., "Pair-Cat Codes: Autonomous Error-Correction with Low-Order Nonlinearity", Quantum Science and Technology 4, 035007 (2019), pp. 1-29.

Alekhnovich, "More on Average Case vs Approximation Complexity", 44th Annual IEEE Symposium on Foundations of Computer Science, 2003. Proceedings. (IEEE, 2003), pp. 1-10.

Allen et al., "How to Refute a Random CSP", 2015 IEEE 56th Annual Symposium on Foundations of Computer Science (IEEE, 2015), pp. 689-708.

Altarelli et al. "Relationship between Clustering and Algorithmic Phase Transitions in the Random k-XORSAT Model and its NP-Complete Extensions", Journal of Physics: Conference Series (IOP Publishing, 2008), vol. 95, p. 012013, pp. 1-16.

Altshuler et al. Anderson Localization makes Adiabatic Quantum Optimization Fail, Proceedings of the National Academy of Sciences 107, 12446 (2010), 5 pgs.

Andriyash et al., "Can Quantum Monte Carlo Simulate Quantum Annealing?", arXiv preprint arXiv:1703.09277 (2017), pp. 1-12.

Anshu et al, "Concentration Bounds for Quantum States and Limitations on the QAOA from Polynomial Approximations", Quantum 7, 999 (2023), pp. 1-28.

Anshu et al, "Improved Approximation Algorithms for Bounded-Degree Local Hamiltonians", Physical Review Letters 127, 250502 (2021), p. 250502-1-250502-6.

Arora et al., "Computational Complexity: a Modern Approach", Draft of Book: Dated Jan. 2007, Cambridge University Press, 2009), 489 pgs.

Atia et al., "How the High-Energy Part of the Spectrum Affects the Adiabatic Computation Gab", arXiv preprint arXiv:1906.02581 (2019) pp. 1-14.

Babbush et al. "Focus Beyond Quadratic Speedups for Error-Corrected Quantum Advantage", PRX Quantum 2, 010103 (2021) pp. 010103-1-010103-11.

Baldwin et al., "Quantum Algorithm for Energy Matching in Hard Optimization Problems", Physical Review B 97, 224201 (2018), pp. 224201-1-002201-19.

Baldwin et al., "The Many-Body Localized Phase of the Quantum Random Energy Model" Physical Review B 93, 024202 (2016), pp. 024202-1-024202-15.

Baldwin, "Clustering of Nonergodic Eigenstates in Quantum Spin Glasses ", Physical Review Letters 118, 127201 (2017), pp. 127201-1-127201-6.

Bao et al., "Optimal Control of Superconducting Gmon Qubits using Pontryagin's Minimum Principle: Preparing a Maximally Entangled State with Singular Bang-Bang Protocols", Physical Review A 97, 062343 (2018), pp. 062343-1-062343-8.

Bapst et al., The Quantum Adiabatic Algorithm Applied to Random Optimization Problems: The Quantum Spin Glass Perspective, Physics Reports 523, 127, arXiv:1210.0811v2, (2012), 154 pgs.

Barak et al., "Beating the Random Assignment on Contraint Satisfaction Problems of Bounded Degree", arXiv preprint arXiv:1505.03424 (2015).

Barends et al., "Logic Gates at the Surface Code threshold: Superconducting Qubits Poised for Fault-Tolerant Quantum Computing", Nature 508, 500, 10.1038/nature13171 (2014), 16 pgs.

Basso et al. "Performance and Limitations of the QAOA at Constant Levels on Large Sparse Hypergraphs and Spin Glass Models", 2022 IEEE 63rd Annual Symposium on Foundations of Computer Science (Focs) (IEEE, 2022), pp. 335-343.

Basso et al. "The Quantum Approximate Optimization Algorithm at High Depth for MaxCut on Large-Girth Regular Graphs and the Sherrington-Kirkpatrick Model", arXiv preprint arXiv:2110.14206v3 (2022), 39 pgs.

Bauza et al., "Scaling Advantage in Approximate Optimization with Quantum Annealing", arZiv:2401.07184v1 (2024), 11 pgs.

Bellitti et al., "Entropic Barriers as a Reason for Hardness in Both Classical and Quantum Algorithms", zrXiv:2102.000182v2 (2021).

Benchasattabuse et al., "Lower Bounds on Number of QAOA Rounds Required for Guaranteed Approximation Rations", arXiv preprint arXiv:2308.15442 (2023), 16 pgs.

Blais et al. "Tunable Coupling of Superconducting Qubits", Phys. Rev. Lett. 90, 127901 (2003), 127901-1-127901-4.

Boixo et al. "Quantum Annealing with More than One Hundred Qubits", Nature Physics 10, 218, arXiv:1304.4595v2 (2013), 26 pgs.

Boulebnane et al., "Predicting Parameters for the Quantum Approximate Optimization Algorithm for MAX-CUT from the Infinite-Size Limit", arXiv preprint arXiv:2110.10685 (2021), 59 pgs.

Bravyi et al. "Hybrid Quantum-Classical Algorithms for Approximate Graph Coloring", Quantum 6, 678 (2022), 27 pgs.

Bravyi et al "Schrieffer-Wolff Transformation for Quantum Many-Body Systems", Annals of physics 326, 2793 (2011), 50 pgs.

Bylander et al., "Dynamical Decoupling and Noise Spectroscopy with a Superconducting Flux Qubit", Nature Physics 7, 565 (2011), 24 pgs.

Čepaité et al, "Counterdiabatic Optimized Local Driving", PRX Quantum 4, 010312 (2023), URL https://link.aps. org/doi/10.1103/PRXQuantum.4.010312, pp. 010312-1-010312-21.

Chen et al., "Qubit Architecture with High Coherence and Fast Tunable Coupling", Phys. Rev. Lett. 113, 220502 (2014), pp. 220502-1-220502-5.

Choi, "Minor-Embedding in Adiabatic Quantum Computation: II. Minor-Universal Graph Design", Quantum Information Processing 10, 343, zrXiv:1001.3116v2 (2010), 13 pgs.

Choi "Minor-Embedding in Adiabatic Quantum Computation: I. The Parameter Setting Problem", Quantum Information Processing 7, 193 (2008), 20 pgs.

Cohen et al., "Dissipation-Induced Continuous Quantum Error Correction for Superconducting Circuits", Phys. Rev. A. 90, 062344 (2014), 062344-1-062344-9.

Crescenzi et al, "A Compendium of NP Optimization Problems", (1995), 118 pgs.

D'Orsi et al, "A Ihara-Bass Formula for Non-Boolean Matrices and Strong Refutations of Random CSPs", arXiv preprint arXiv:2204.10881v2 (2023), 67 pgs.

Dalzell et al, "Mind the Gab: Achieving a Super-Grover Quantum Speedup by Jumping to the End", in Proceedings of the 55th Annual ACM SymposiumonTheory of Computing (2023), pp. 1131-1144.

Das et al., "Colloquium: Quantum Annealing and Analog Quantum Computation", Reviews of Modern Physics 80, 1061 (2008), 21 pgs.

Dempster et al., "Understanding Degenerate Ground States of a Protected Quantum Circuit in the Presence of Disorder", Physical Review B 90, 094518 (2014), 094518-1-094518-12.

Deng et al, "Majorana Bound States in a Coupled Quantum-Dot Hybrid-Nanowire System", Science 354, 1557, arXiv:1612.07989v2 (2017), 24 pgs.

Derrida, "Random-Energy Model: Limit of a Family of Disordered Models", Physical Review Letters 45, 79 (1980), 5 pgs.

Dubois et al., "The 3-XORSAT Threshold", Comptes Rendus Mathematique 335, 963 (2002), pp. 963-966.

(56) References Cited

OTHER PUBLICATIONS

Ebadi et al, "Quantum Optimization of Maximum Independent Set using Rydberg Atom Arrays", Science 376, 1209 (2022), 42 pgs.
Farhi et al. "A Quantum Approximate Optimization Algorithm", arXiv preprint arXiv:1411.4028v1 (2014), 16 pgs.
"AC/DC Module User's Guide", https://doc.comsol.com/5.5/docserver/#!/com.comsol.help.acdc/html_ACDCModuleManual.html, (2020), pp. 1-366.
"Semiconductor Module User's Guide", https://doc.comsol.com/5.5/docserver/#!/com.comsol.help.semicond/html_SemiconductorModuleManual.html, (2020), pp. 1-309.
Ancona, M. G., "Density-Gradient Theory: A Macroscopic Approach to Quantum Confindment and Tunneling in Semiconductor Devices", Journal of Computational Electronics 10:65-97, (2011), pp. 1-34.
Arute, et al., "Quantum Supremacy using a Programmable Superconducting Processor", Article, Nature 574, (2019), pp. 505-510.
Barends, et al., "Diabatic Gates for Frequency-Tunable Superconducting Qubits", Phys. Rev. Lett. 123, 210501, (2019), pp. 210501-1-210501-6.
Bialczak, et al., "Fast Tunable Coupler for Superconducting Qubits", Phys. Rev. Lett. 106, 060501, (2011), pp. 060501-1-060501-4.
Casparis, et al., "Voltage-Controlled Superconducting Quantum Bus", Phys. Rev. B 99, 085434, (2019), pp. 085434-1-085434-7.
Hirabayashi, et al., "Dielectric Theory of the Barrier Height at Metal-Semiconductor and Metal-Insulator Interfaces", Phys. Rev. B, vol. 3, (1971), pp. 4023-4025.
Huang, et al., "Universal Stabilization of Single-Qubit States using a Tunable Coupler", Phys. Rev. A97, 062345, (2018), pp. 062345-1-062345-11.
Kim, et al., "Notes on Fermi-Dirac Integrals 4th Edition", arXiv:0811.0116 [cond-mat.mes-hall], (2019), pp. 1-15.
Koch, et al., "Charge-Insensitive Qubit Design Derived from the Cooper Pair Box", Phys. Rev. A 76, 042319, (2007), pp. 042319-1-042319-19.
Larsen, et al., "Semiconductor-Nanowire-Based Superconducting Qubit", Phys. Rev. Lett. 115, 127001, (2015), pp. 127001-1-127001-5.
Li, et al., "Improvements in Silicon Oxide Dielectric Loss for Superconducting Microwave Detector Circuits", IEEE Transactions on Applied Superconductivity, 1501204. vol. 23, No. 3, (2013), pp. 1-4.
Lu, et al., "Universal Stabilization of a Parametrically Coupled Qubit", Phys. Rev. Lett. 119, 150502, (2017), pp. 150502-1-150502-5.
Mayer, W., "Superconducting Proximity Effect in Epitaxial Al—InAs Heterostructures", Appl. Phys. Lett. 114, 103104, (2019), pp. 103104-1-103104-5.
McRae, et al., "Cryogenic Microwave Loss in Epitaxial Al/GaAs/Al Trilayers for Superconducting Circuits", arXiv:2009.10101, (2020), pp. 1-5.
Minev, Z. K., "Catching and Reversing a Quantum Jump Mid-Flight", arXiv:1902.10355 [quant-ph], (2019), pp. 1-209.
Minev, et al., "Energy-Participation Quantization of Josephson Circuits", arXiv:2010.00620 [quant-ph], (2020), pp. 1-42.
Nigg, et al., "Black-Box Superconducting Circuit Quantization", Phys. Rev. Lett. 108, 240502, (2012), pp. 240502-1-240502-5.
Oliver, W. D., "Materials in Superconducting Quantum Bits", MRS Bulletin, vol. 38, (2013), pp. 816-825.
Orlando, et al., "Superconducting Persistent-Current Qubit", Phys. Rev. B 60, 15398, (1999), pp. 15398-15413.
Sardashti, et al., "Voltage-Tunable Superconducting Resonators: A Platform for Random Access Quantum Memory", IEEE Transactions on Quantum Engineering, 5502107, vol. 1, (2020), pp. 1-7.
Schuster, D. I., "Circuit Quantum Electrodynamics, Ph.D. Thesis", Yale University, (2007), pp. 1-255.
Scigliuzzo, et al., "Phononic Loss in Superconducting Resonators on Piezoelectric Substrates", New Journal of Physics 22, 053027, (2020), pp. 1-9.
Solgun, et al., "Blackbox Quantization of Superconducting Circuits using Exact Impedance Synthesis", Phys. Rev. B 90, 134504, (2014), pp. 134504-1-134504-12.
Wang, C., "Surface Participation and Dielectric Loss in Superconducting Qubits", Appl. Phys. Lett. 107, 162601, (2015), pp. 2-11.
Wenner, et al., "Surface Loss Simulations of Superconducting Coplanar Waveguide Resonators", Appl. Phys. Lett. 99, 113513, (2011), pp. 1-4-S1-S4.
Wickramasinghe, et al., "Transport Properties of Near Surface InAs Two-Dimensional Heterostructures", Appl. Phys. Lett. 113, 262104, (2018), pp. 1-5.
Yang et al., "Optimizing Variational Quantum Algorithms Using Pontryagin's Minimum Principle", Physical Review X 7, 021027 (2017), pp. 021027-1-021027-10.
Zhang et al., "Adaptive variational Quantum Eigensolvers for Highly Excited States", Physical Review B 104, 075159 (2021), pp. 075159-1-075159-9.
Zhu et al., "Adaptive Quantum Approximate Optimization Algorithm for Solving Combinatorial Problems on a Quantum Computer", Physical Review Research 4, 033029 (2022), pp. 033029-1-033029-9.
Leghtas et al., "Hardware-Efficient Autonomous Quantum Memory Protection", Phys. Rev. Lett. 111, 120501 (2013), 120501-1-120501-29.
Leghtas et al. "Confining the State of Light to a Quantum Manifold by Engineered Two-Photon Loss", Science 347, 6224, arZiv:1412.4633v1 (2014), 32 pgs.
Lescanne et al., "Exponential Suppression of Bit-Flips in a Qubit Encoded in a Oscillator", Nature Physics 16, 509, arXiv:1907.11729v1 (2019), 18 pgs.
Malekakhlagh et al., "First-Principles Analysis of Cross-Resonance Gate Operation", Physical Review A 102, 042605 (2020), 30 pgs.
Marwaha et al., "Bounds on Approximating Max kXOR with Quantum and Classical Local Algorithms", Quantum 6, 757 (2022), 25 pgs.
McClean et al. "The Theory of Variational Hybrid Quantum-Classical Algorithms", New Journal of Physics 18, 023023, arXiv:1509.04279v1 (2015), 20 pgs.
McKay et al., "A Universal Gate for Fixed-Frequency Qubits via a Tunable Bus", arXiv:1604.03076 (2016), 10 pgs.
Mézard et al., "Analytic and Algorithmic Solution of Random Satisfiability Problems", Science 297, 812 (2002), pp. 812-815.
Mézard et al., "Clustering of Solutions in the Random Satisfiability Problem", Physical Review Letters 94, 197205 (2005), 4 pgs.
Michael et al., "New Class of Quantum Error-Correcting Codes for a Bosonic Mode", Phys. Rev. X 6, 031006 (2016), 25 pgs.
Mirrahimi et al., "Dynamically Protected Cat-Qubits: A New Paradigm for Universal Quantum Computation", New J. Phys. 16, 045014, arXiv:1312.2017v1 (2013), 28 pgs.
Montanari, "Optimization of the Sherrington-Kirkpatrick Hamiltonian", SIAM Journal on Computing pp. FOCS19-1 (2021), 38 pgs.
Amin et al., "Quantum Error Mitigation in Quantum Annealing", arXiv:2311.01306v1 [quant-ph] (2023), 10 pgs.
Mossi et al., "Embedding Quantum Optimization Problems using AC Driven Quantum Ferromagnets", arXiv preprint arXiv:2306.10632 (2023), 22 pgs.
Motzoi et al., "Simple Pulses for Elimination of Leakage in Weakly Nonlinear Qubits", Phys. Rev. Lett. 103, 110501 (2009), 10.1103/Phys-RevLett.103.110501, pp. 110501-1-110501-4.
Mourik et al., "Signatures of Majorana Fermions in Hybrid Superconductor-Semiconductor Nanowire Devices", Science 336, 1003 (2012), 28 pgs.
Neill et al., "A Blueprint for Demonstrating Quantum Supremacy with Superconducting Qubits", arXiv preprint arXiv:1709.06678 (2017), 22 pgs.
Nguyen et al., "Quantum Optimization with Arbitrary Connectivity using Rydberg Atom Arrays", PRX Quantum 4, 010316 (2023), 19 pgs.
Ofek et al., "Demonstrating Quantum Error Correction that Extends the Lifetime of Quantum Information", Nature 536, 441 (2016), 10.1038/nature 18949, 44 pgs.
Pal et al., "The Many-Body Localization Phase Transition", Physical review b 82, 174411 (2010), 5 pgs.

(56) References Cited

OTHER PUBLICATIONS

Parisi, Infinite Number of Order Parameters for Spin-Glasses, Physical Review Letters 43, 1754 (1979), 3 pgs.
Perez et al., "Error-Divisible Two-Qubit Gates", arXiv preprint arXiv:2110.11537 (2021), 11 pgs.
Peruzzo et al., "A Variational Eigenvalue Solver on a Quantum Processor", Nature communications 5, 4213, arXiv:1304.3061v1 (2013), 10 pgs.
Pietracaprina et al., "Forward Approximation as a mean-field approximation for the Anderson and Many-Body Localization Transitions", Physical Review B 93, 054201 (2016), pp. 054201-1-054201-15.
Prada et al., "From Andreev to Majorana Bound States in Hybrid Superconductor-Semiconductor Nanowires", Nature Reviews Physics 2, 575 (2020), 23 pgs.
Reagor et al., "Quantum Memory with Millisecond Coherence in Circuit QED", Phys. Rev. B 94, 014506 (2016), pp. 014506-1-014506-8.
Roland et al., "Quantum Search by Local Adiabatic Evolution", Phys. Rev. A 65, 042308 (2002), pp. 042308-1-042308-6.
Santagati et al., "Witnessing Eigenstates for Quantum Simulation of Hamiltonian Spectra", Science advances 4, eaap9646 (2018), 27 pgs.
Scardicchio et al., "Perturbation Theory Approaches to Anderson and Many-Body Localization: Some Lecture Notes", arXiv preprint arXiv:1710.01234 (2017), 41 pgs.
Sels et al., "Minimizing Irreversible Losses in Quantum Systems by Local Counterdiabatic Driving", Proceedings of the National Academy of Sciences 114, E3909 (2017), 8 pgs.
Serbyn et al., "Thouless Energy and Multifractality Across the Many-Body Localization Transition", Physical Review B 96, 104201 (2017), 104201-1-104201-12.
Shaydulin et al., "Evidence of Scaling Advantage for the Quantum Approximate Optimization Algorithm on a Classically Intractable Problem", arXiv preprint arXiv:2308.02342, arXiv:2308.02342v2 (2024), 33 pgs.
Smelyanskiy et al., "Intermittency of Dynamical Phases in a Quantum Spin Glass", arXiv preprint arXiv:1907.01609 (2019), 16 pgs.
Smelyanskiy et al., "Non-Ergodic Delocalized States for Efficient Population Transfer within a Narrow Band of the Energy Landscape", arXiv preprint arXiv:1802.09542 (2018), 48 pgs.
Somoroff et al., "Millisecond Coherence in a Superconducting Qubit", arXiv preprint arXiv:2103.08578 (2021), 14 pgs.
Srinivasan et al., "Tunable Coupling in Circuit Quantum Electrodynamics Using a Superconducting Charge Qubit with a V-Shaped Energy Level Diagram", Phys. Rev. Lett. 106, 083601 (2011), pp. 083601-1-083601-4.
Stanescu et al., "Majorana Fermions in Semiconductor Nanowires: Fundamentals, Modeling, and Experiment", Journal of Physics: Condensed Matter 25, 233201 (2013), 32 pgs.
Sung et al., "Realization of High-Fidelity CZ and ZZ-free iSWAP Gates with a Tunable Coupler", arXiv:2011.01261 quant-ph] (2021), 34 pgs.
Susa et al., "Quantum Annealing of the p-spin Model under Inhomogeneous Transverse Field Driving", Phys. Rev. A 98, 042326 (2018), URL https://link.aps.org/doi/10.1103/PhysRevA.98.042326, pp. 042326-1-042326-13.
Suzuki et al., "Qulacs: A Fast and Versatile Quantum Circuit Simulator for Research Purpose", Quantum 5, 559 (2021), 34 pgs.
Tang et al., "Unconventional Quantum Annealing Methods for Difficult Trial Problems", Physical Review A 103, 032612 (2021), 032612-1-032612-12.
Tazi et al., "Folded Spectrum VQE: A Quantum Computing Method for the Calculation of Molecular Excited States", arXiv preprint arXiv:2305.04783v2 (2024), 17 pgs.
Terhal, "Quantum Error Correction for Quantum Memories", Rev. Mod. Phys. 87, 307 (2015), 10.1103/RevModPhys.87.307, pp. 307-346.
Tilly et al., "The Variational Quantum Eigensolver: A Review of Methods and Best Practices", Physics Reports 986, 1 (2022), 156 pgs.

Touzard et al., "Coherent Oscillations Inside a Quantum Manifold Stabilized by Dissipation", Physical Review X 8, 021005 (2018), pp. 021005-1-021005-7.
Venturelli et al., "Quantum Optimization of Fully Connected Spin Glasses", Physical Review X 5, 031040 (2015), pp. 031040-1-031040-8.
Vy et al., "Error-Transparent Evolution: The Ability of Multi-Body Interactions to Bypass Decoherence", New Journal of Physics 15, 053002 (2013), 14 pgs.
Weiss et al., "Spectrum and Coherence Properties of the Current-Mirror Qubit", Physical Review B 100, 224507 (2019), pp. 224507-1-224507-17.
Xiong et al., "Arbitrary Controlled-Phase Gate on Fluxonium Qubits Using Differential ac Stark Shifts", Physical Review Research 4, 023040 (2022), pp. 023040-1-023040-16.
Yan et al., "Rotating-Frame Relaxation as a Noise Spectrum Analyzer of a Superconducting Qubit Undergoing Driven Evolution", Nature Communications 4, 2337, arXiv:1508.06436v1 (2015), 31 pgs.
Wang et al., "Electronic Structure Pseudopotential Calculations of Large (~1000 Atoms) Si Quantum Dots", J. Phys. Chem. 1994, 98, 8, 2158-2165.
Devoret et al., "Superconducting Circuits for Quantum Information: An Outlook", Science, Mar. 8, 2013, vol. 339, Issue 6124, pp. 1169-1174.
Earl et al., "Parallel Tempering: Theory, Applications, and New Perspectives", arXiv:physics/0508111v2 [physics.comp-ph], Aug. 19, 2005.
Johnson et al., "Quantum Annealing with Manufactured spins", Nature 473, 194-198 (2011).
Jörg et al., "Energy Gaps in Quantum First-Order Mean-Field-Like Transitions: The problems that Quantum Annealing Cannot Solve", arXiv:0912.4865v2 [quant-ph] Jan. 28, 2010.
Khot et al., "Linear Equations Modulo 2 and the L1 Diameter of Convex Bodies", in 2007 48th Annual IEEE Symposium on Foundations of Computer Science, Providence, RI, 2007, pp. 318-328.
King, Andrew D., et al. "Observation of Topological Phenomena in a Programmable Lattice of 1,800 Qubits." Nature, vol. 560, No. 7719, Aug. 2018, p. 456. Gale OneFile: Health and Medicine.
Monasson, Rémi, Optimization Problems and Replica Symmetry Breaking In Finite Connectivity Spin Glasses. Journal of Physics A: Mathematical and General, vol. 31, Issue 2, pp. 513-529 (1998).
Sahni et al, "P-Complete Approximation Problems", Journal of the ACM (JACM), vol. 23, Issue 3, pp. 555-565.
J. D. Ullman, "NP-Complete Scheduling Problems," Journal of Computer System Sciences, vol. 10, No. 3, 1975, pp. 384-393.
Wang et al., "Solving Schrödinger's Equation Around a Desired Energy: Application to Silicon Quantum Dots", J. Chem. Phys. Feb. 1, 1994; 100 (3): 2394-2397.
Woeginger, G.J., "Exact Algorithms for NP-Hard Problems: A Survey. In: Jünger, M., Reinelt, G., Rinaldi, G. (eds) Combinatorial Optimization—Eureka, You Shrink!", Lecture Notes in Computer Science, vol. 2570. pp 185-207, Springer, Berlin, Heidelberg (2003).
Wei Xu et al., "Clustering Phase of a General Constraint Satisfaction Problem Model d-k-CSP, Physica A: Statistical Mechanics and its Applications", vol. 537, 2020, 122708.
Hen, et al., "Quantum Annealing for Constrained Optimization", Physical Review Applied 5, 034007 (Year: 2016), 2016, 034007-1-034007-7.
Kapit, Eliot, "Improved Quantum Annealer Performance from Oscillating Transverse Fields", arXiv:1710.11056v1 [quant-ph] (Year: 2017), Oct. 30, 2017, 16 pgs.
Kapit, et al., "On the approximability of random-hypergraph MAX-3-XORSAT problems with quantum algorithms", May 20, 2024, 43 pgs.
Lucas, Andrew, "Hard Combinatorial Problems and Monor Embeddings on Lattice Graphs", arXiv:1812.01789v1 [quant-ph] (Year: 2018), Dec. 5, 2018, 33 pgs.
Campbell, Earl, "Random compiler for fast Hamiltonian simulation", Physical review letters 123, No. 7 (2019): 070503. (Year: 2019).

(56) References Cited

OTHER PUBLICATIONS

Nichol, et al., "High-fidelity entangling gate for double-quantum-dot spin qubits", npj Quantum Information 3, No. 1 (2017): 3. (Year: 2017).

Pastorello, et al., Learning adiabatic quantum algorithms for solving optimization problems, arXiv:1909.06870v1 [quant-ph] Sep. 15, 2019 (Year: 2019).

Venturelli, et al., "Compiling quantum circuits to realistic hardware architectures using temporal planners", Quantum Science and Technology 3, No. 2 (2018): 025004. (Year: 2018).

S. Adachi, "III-V Ternary and Quaternary Compounds," in Springer Handbook of Electronic and Photonic Materials, edited by S. Kasap and P. Capper (Springer International Publishing, Cham, 2017) pp. 725-741.

M. P. C. M. Krijn, "Heterojunction band offsets and effective masses in III-V quaternary alloys," Semiconductor Science and Technology 6, 27-31 (1991 ).

B. Streetman and S. Banerjee, "Energy bands and charge carriers in semiconductors," in Solid State Electronic Devices (Pearson, 2015) Chap. 5, pp. 238-243.

Farhi et al., "Unstructured Randomness, Small Gaps and Localization", arXiv preprint arXiv:1010.0009 (2010), 17 pgs.

Farhi et al. "The Quantum Approximate Optimization Algorithm and the Sherrington-Kirkpatrick Model at Infinite Size", Quantum 6, 759 (2022), 32 pgs.

Farhi et al "Quantum Computation by Adiabatic Evolution", arXiv:quant-ph/0001106 (2000), 24 pgs.

Finnila et al., "Quantum Annealing: A New Method for Minimizing Multidimensional Functions", Chemical physics letters 219, 343 (1994), 9 pgs.

Flensberg et al., "Engineered Platforms for Topological Superconductivity and Majorana Zero Modes", Nature Reviews Materials 6, 944 (2021), 17 pgs.

Foxen et al., "Demonstrating a Continuous Set of Two-Qubit Gates for Near-Term Quantum Algorithms", arXiv preprint arXiv:2001.08343 (2020), 20 pgs.

Fowler et al. "Surface Codes: Towards Practical Large-Scale Quantum Computation", Phys. Rev. A 86, 032324 (2012), 10.1103/PhysRevA.86.032324, pp. 032324-1-032324-48.

Garey et al., "Some Simplified NP-Complete Problems", Proceedings of the sixth annual ACM symposium on Theory of computing (1974), pp. 47-63.

Geller et al., "Tunable Coupler for Superconducting Xmon Qubits: Perturbative Nonlinear Modeal", arXiv:1405.1915 (2014), 10 pgs.

Gilyén et al, "(Sub)Exponential Advantage of Adiabatic Quantum Computation with No Sign Problem", Proceedings of the 53rd Annual ACM SIGACT Symposium on Theory of Computing (2021), pp. 1357-1369.

Granet et al., "Benchmarking a Heuristic Floquet Adiabatic Algorithm for the Max-Cut Problem", arXiv preprint arXiv:2404.16001 (2024), 6 pgs.

Graß, "Quantum Annealing with Longitudinal Bias Fields", Phys. Rev. Lett. 123, 120501 (2019), URL https://link.aps.org/doi/10.1103/PhysRevLett.123.120501, 120501-1-120501-6.

Grattan et al., "Exponential Acceleration of Macroscopic Quantum Tunneling in a Floquet Ising Model", arXiv:2311.17814v3 (2024), 2311.17814, 13 pgs.

Grest et al, "Cooling-Rate Dependence for the Spin-Glass Ground-State Energy: Implications for Optimization by Simulated Annealing", Physical Review Letters 56, 1148 (1986), 4 pgs.

Groszkowski et al., Coherence properties of the 0-π qubit, New Journal of Physics 20, 043053 (2018), 21 pgs.

Grover et al. "Fast, Lifetime-Preserving Readout for High-Coherence Quantum Annealers", PRX Quantum 1, 020314 (2020), 020314-1-020314-13.

Gul et al, "Ballistic Majorana Nanowire Devices", Nature nanotechnology 13, 192, zrZiv:1603.04069v3 (2021), 19 pgs.

Gyenis et al, "Moving Beyond the Transmon: Noise-Protected Superconducting Quantum Circuits", PRX Quantum 2, 030101 (2021), 16 pgs.

Gyenis et al., "Experimental Realization of an Intrinsically Error-Protected Superconducting Qubit", arXiv preprint arXiv:1910.07542 (2019), 31 pgs.

Harris et al. "Sign- and Magnitude-Tunable Coupler for Superconducting Flux Qubits", Phys. Rev. Lett. 98, 177001 (2007), 177001-1-177001-4.

Hartmann et al., Phase Transitions in Combinatorial Optimization Problems: Basics, Algorithms and Statistical Mechanics (John Wiley & Sons, 2006), 45 pgs.

Håstad et al., On the Advantage over a Random Assignment, Proceedings of the thirty-fourth annual ACM symposium on Theory of computing (2002), pp. 43-52.

Håstad, "Some Optimal Inapproximability Results", Journal of the ACM (JACM) 48, 798 (2001), pp. 798-859.

Hastings "A Short Path Quantum Algorithm for Exact Optimization", Quantum 2, 78 (2018), 22 pgs.

Hastings "The Power of Adiabatic Quantum Computation with No Sign Problem", Quantum 5, 597 (2021), 24 pgs.

Hauke et al. "Perspectives of Quantum Annealing: Methods and Implementations", arXiv preprint arXiv:1903.06559 (2019), 37 pgs.

Heeres et al., "Implementing a Universal Gate Set on a Logical Qubit Encoded in an Oscillator",arXiv:1608.02430 (2016), 16 pgs.

Heim et al., "Quantum versus Classical Annealing of Ising Spin Glasses", Science 348, 215, arXiv:1411.5693v1 (2014), 5 pgs.

Hillar et al., "Most Tensor Problems are NP-Hard", Journal of the ACM (JACM) 60, 1 (2013), 38 pgs.

Hochbaum, "Approrimation Algorithms for NP-Hard Problems", ACM Sigact News 28, 40 (1997), 13 pgs.

Ibrahimi et al. "The Set of Solutions of Random XORSAT Formulae", Proceedings of the twenty-third annual ACM-SIAM symposium on Discrete Algorithms (SIAM, 2012), pp. 760-779.

Isakov et al. "Understanding Quantum Tunneling through Quantum Monte Carlo Simulations", Physical review letters 117, 180402 (2016), 180402-1-180402-6.

Jiang et al, "Path-Integral Quantum Monte Carlo Simulation with Open-Boundary Conditions",Physical Review A 96, 042330 (2017), 11 pgs.

Jiang et al., "Scaling Analysis and Instantons for Thermally-Assisted Tunneling and Quantum Monte Carlo Simulations", Physical Review A 95, 012322 (2017), 15 pgs.

Jones et al., "Random Max-CSPs Inherit Algorithmic Hardness from Spin Glasses",arXiv preprint arXiv:2210.03006v2 (2023), 41 pgs.

Kadowaki et al., "Quantum Annealing in the Transverse Ising Model", Physical Review E 58, 5355 (1998), 23 pgs.

Kapit et al., "Noise-Tolerant Quantum Speedups without Fine Tuning", Quantum Science and Technology 6, 025013 (2021), 31 pgs.

Kapit, "Error-Transparent Quantum Gates for Small Logical Qubit Architectures", arXiv:1703.09762 (2017), 8 pgs.

Kapit, "Hardware-Efficient and Fully Autonomous Quantum Error Correction in Superconducting Circuits", Phys. Rev. Lett. 116, 150501 (2016), 10.1103/PhysRevLett.116.150501, 150501-1-150501-5.

Kapit, "Error-Transparent Quantum Gates for Small Logical Qubit Architectures", Physical review letters 120, 050503 (2018), 050503-1-050503-5.

Kapit, "The Upside of Noise: Engineered Dissipation as a Resource in Superconducting Circuits", Quantum Science and Technology 2, 033002 (2017), 24 pgs.

Kechedzhi et al., "Efficient Population Transfer via Non-Ergodic Extended States in Quantum Spin Glass", arXiv preprint arXiv:1807.04792 (2018), 16 pgs.

Kim et al., "Rydberg Quantum Wires for Maximum Independent Set Problems with Nonplanar and High-Degree Graphs", arXiv preprint arXiv:2109.03517 (2021), 8 pgs.

King et al., "Scaling Advantage in Quantum Simulation of Geometrically Frustrated Magnets", et al., arXiv preprint arXiv:1911.03446 (2019), 29 pgs.

Knysh, "Zero-Temperature Quantum Annealing Bottlenecks in the Spin-Glass Phase", Nature communications 7 (2016), 9 pgs.

(56) References Cited

OTHER PUBLICATIONS

Könz et al., "Embedding Overhead Scaling of Optimization Problems in Quantum Annealing", PRX Quantum 2, 040322 (2021), 040322-1-040322-11.
Korte et al., "Combinatorial Optimization", Fifth Edition, vol. 11 (Springer, 2011), 664 pgs.
Kowalsky et al. "3-Regular 3-XORSAT Planted Solutions Benchmark of Classical and Quantum Heuristic Optimizers", arXiv preprint arXiv:2103.08464v2, (2022), 17 pgs.
Krzakala et al., "Landscape Analysis of Constraint Satisfaction Problems", Physical Review E 76, 021122 (2007), 021122-1-021122-13.
Kuwahara et al. "Floquet-Magnus Theory and Generic Transient Dynamics in Periodically Driven Many-Body Quantum Systems", Annals of Physics 367, 96 (2016), 19 pgs.

\* cited by examiner

TUNABLE CAPACITOR FOR SUPERCONDUCTING QUBITS

CROSS-REFERENCE TO RELATED APPLICATION

This application claims priority to U.S. Provisional Application No. 63/132,831, filed Dec. 31, 2020, entitled "Tunable Capacitor for Superconducting Qubits Using an InAs/InGaAs Heterostructure," the contents of which are incorporated herein in their entirety for all purposes.

BACKGROUND

Tunable couplers for superconducting qubits, once a long-term investment in future quantum computers and a direction towards improving two-qubit gate fidelities are now a centerpiece of large qubit arrays. The recent quantum supremacy demonstration owes its success in part to the two qubit gate fidelities across the chip facilitated by fast, tunable couplers. Frequently realized as a mutual inductance or effective capacitance between nearest-neighbor qubits and tuned by flux-biased superconducting quantum interference devices (SQUIDs), these couplers naturally integrate with both fixed and flux-tunable superconducting qubits.

Recent advancements in semiconductor-superconductor junctions as gate-tunable Josephson junctions have led to new proposals and realizations of coupling schemes to superconducting storage units and readout buses. Unlike their transmon counterparts, these hybrid systems employ various III-V semiconductor materials with properties tunable in both fabrication and with external electric fields as opposed to the canonical, fixed fabrication Al/Al2O3 and Nb-based device stacks that rely on external current sources for tuning.

As with prior attempts to improve coherence with new materials, there are challenges in realizing high coherence gatemon qubits, where an applied electric potential depletes a superconductor-semiconductor-superconductor junction. Recent dielectric loss studies of III-V materials, specifically Al/GaAs/Al trilayers, suggest that the piezoelectricity of GaAs can contribute to higher losses compared to sapphire or silicon substrates. Apart from the aforementioned experimental results for GaAs, there have been no other studies that have measured the loss in III-V materials at single photon powers and millikelvin temperatures. A solution that addresses both the issue of realizing a fast, tunable coupler and quantifying its potential as an additional source of dielectric loss has proven difficult.

DETAILED DESCRIPTION

This disclosure includes examples of a tunable coupler to control interactions between solid-state qubits, including interactions between solid-state qubits in a single, two-dimensional (2D) layer, interactions between three-dimensional (3D) cavities, or any combination thereof. In some examples, the solid-state qubits may include superconducting qubit, quantum-dot qubits, flux-qubits, 3D cavities, or any other type of solid-state qubits. The tunable coupler may include a capacitor with source and drain terminals each connected to a respective qubit, and a plurality of gate terminals that are selectively enabled to adjust or control a capacitance. In some examples, adoption of fast, parametric coupling elements may improve the performance of superconducting qubits. A low loss, high contrast coupler may be useful in scaling up quantum computing systems. In some examples, the gate-tunable coupler may be formed using a two-dimensional electron gas in an InAs/InGaAs heterostructure. Such an implementation may yield an on/off ratio of over two orders of magnitude.

The gate voltage-controlled capacitive coupling element between neighboring superconducting qubits described herein may include a pair of fixed air-gap capacitors with a single, effective capacitance that is tuned by a collection of gates (e.g., metal oxide) that deplete a two-dimensional electron gas (2DEG) in a semiconductor heterostructure (e.g., InAs/InGaAs heterostructure). The described coupling element relying on tuning of electric fields to control qubit interactions may be a replacement for a flux-biased superconducting quantum interference device (SQUID)-based inductive couplers (which rely on tuning of electromagnetic fields to control qubit interactions).

Air-gap capacitors isolate the tuning elements, namely the gates, from the qubits, which may reduce stray electric fields on the neighboring qubits as compared with flux-biased SQUID devices, where stray magnetic fields lead to crosstalk between qubits. In some examples, implementations other than the air-gap capacitors may be realized to achieve a tunable capacitor without departing from the scope of the disclosure.

Figure 1:
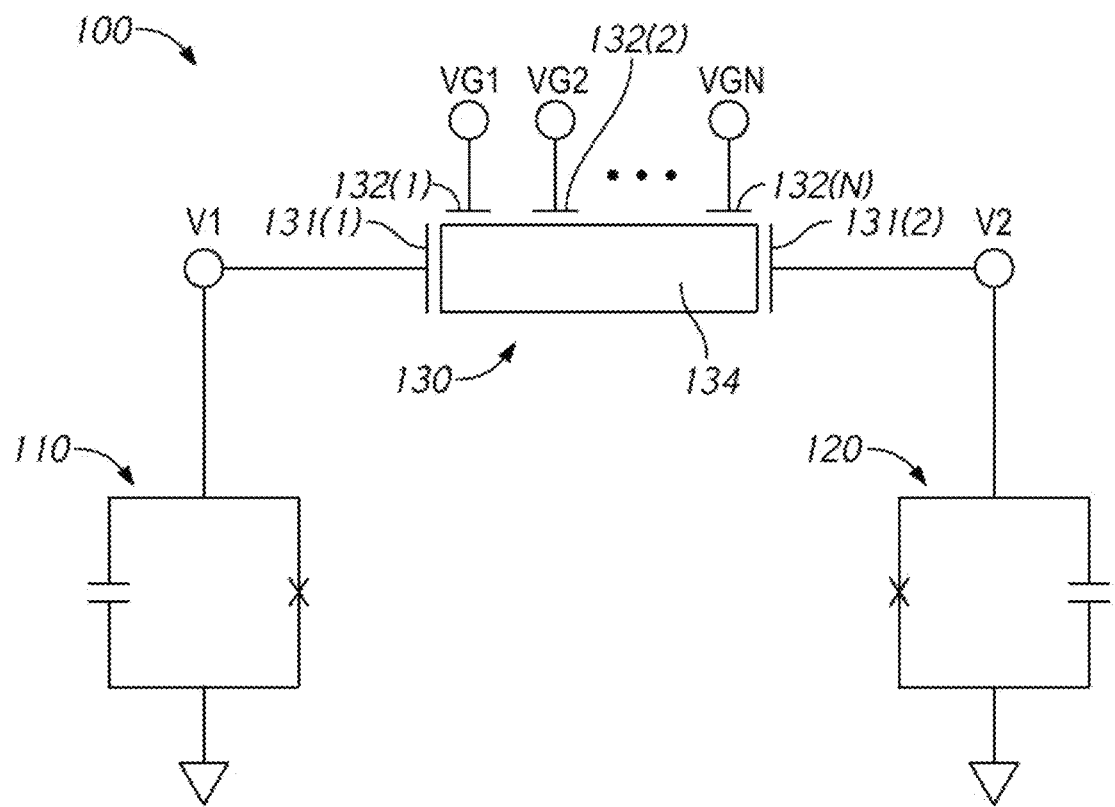
FIG. 1 is a schematic diagram of a 2-qubit quantum system in accordance with embodiments of the present disclosure.

FIG. 1 is a schematic diagram of a 2-qubit quantum system 100 in accordance with embodiments of the present disclosure. The system 100 includes a first qubit 110, a second qubit 120, and a capacitive coupling element 130. The first qubit 110 and the second qubit 120 may form a pair of qubits for which the capacitive coupling element 130 is used to control coupling there between. The first qubit 110 and the second qubit 120 may include any type of transmon qubit.

The capacitive coupling element 130 may include source/drain terminals 131(1), 131(2) at each end that are coupled to the nodes providing the V1 and V2 voltages, respectively. The capacitive coupling element 130 may further include multiple gate terminals 132(1)-132(N), where N is a positive integer. In some examples, N may be equal to 3, 4, 5, etc. In some examples, N may be less than 10. In some examples, the capacitive coupling element 130 may include only two gate terminals. The gate terminals 132(1)-132(N) may be configured to control the conductive properties within the dielectric material 134 to control the effective capacitance of the capacitive coupling element 130. Each of the gate terminals 132(1)-132(N) may be configured to receive a respective gate voltage VG1-VGN. Collectively, the respective VG1-VGN gate voltages may be selected to tune a particular effective capacitance of the capacitive coupling element 130 between the source/drain terminals 131(1), 131(2).

In operation, the VG1-VGN gate voltages may be selected to control coupling between the first qubit 110 and the second qubit 120 by adjusting the capacitance of the capacitive coupling element 130. That is, as the VG1-VGN gate voltages increase, the coupling between the first qubit 110 and the second qubit 120 become tighter, because the capacitance increases within the capacitive coupling element. Implementation of the capacitive coupling element 130 may be a replacement for a flux-biased SQUID-based inductive couplers, and may reduce crosstalk between the field controlling the coupler and the qubits, particularly if the qubits are tunable with magnetic flux.

In some examples, alternatively or additionally, the capacitive coupling element may be configured to adjust the capacitance in response to the alternating-current (AC) fields to perform parametric operations. In some examples, first and second qubits 110 and 120 and the capacitive coupling element 130 may be included in a small logical qubit device. In some examples, one of the pair of qubits may be a solid-state qubit and the other may be a three-dimensional cavity. In some examples, the capacitive coupling element may be configured to adjust the capacitance of the capacitive coupling element to route a signal between the first and qubits 110 and 120. In a multi-qubit architecture on a chip with multiple ones of the tunable elements, the tunable elements may be configured to route signals around the chip for any purpose.

Figure 2:
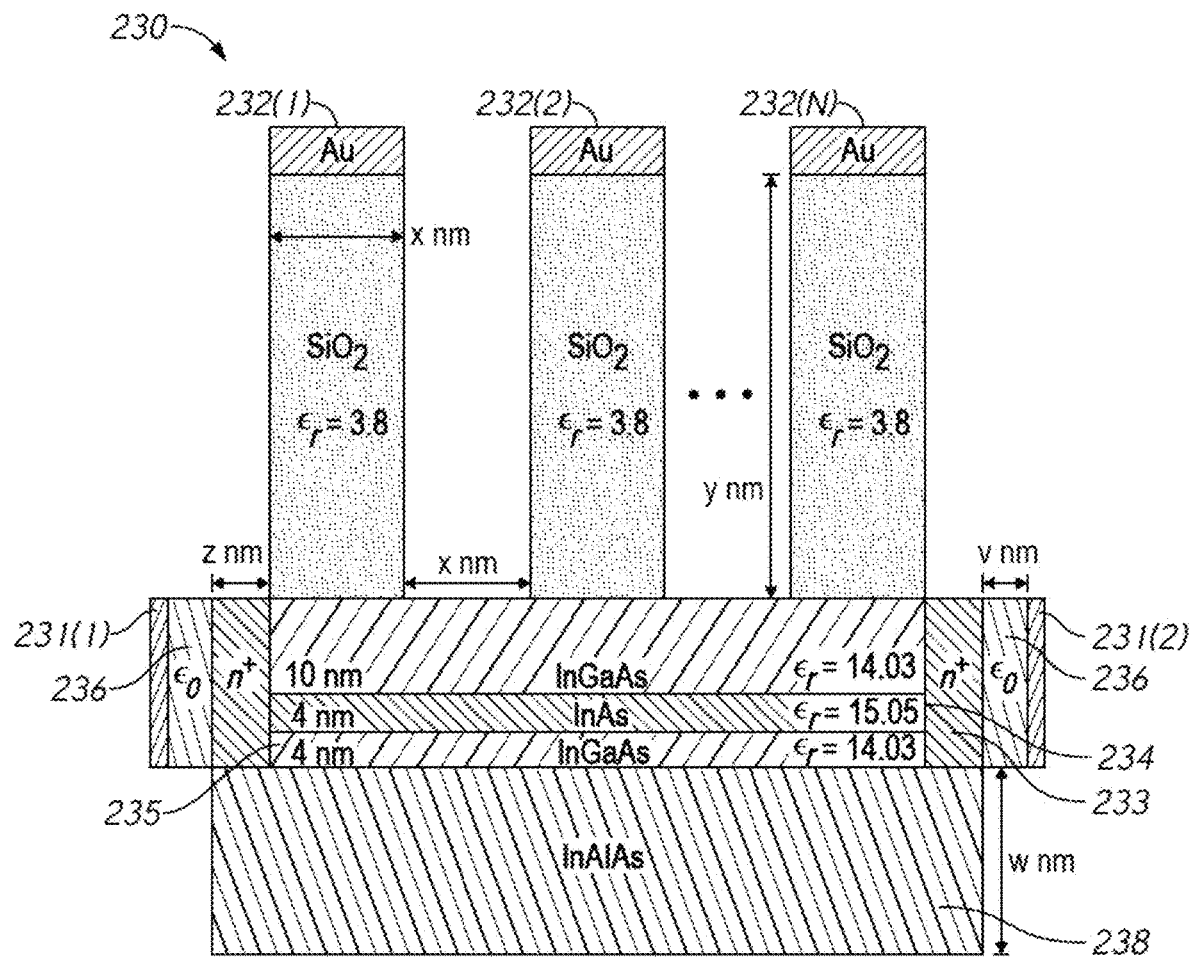
FIG. 2 is a cross-sectional diagram of capacitive coupling element in accordance with embodiments of the disclosure.

FIG. 2 is a cross-sectional diagram of capacitive coupling element 230 in accordance with embodiments of the disclosure. The capacitive coupling element 130 of FIG. 1 may implement the capacitive coupling element 230 in some examples. The capacitive coupling element 230 may include source/drain terminals 231(1), 231(2) at each end. The capacitive coupling element 230 may further include multiple gate terminals 232(1)-232(N) (e.g., Au and $SiO_2$), where N is a positive integer. In some examples, N may be equal to 3, 4, 5, etc. In some examples, N may be less than 10. In some examples, the capacitive coupling element 230 may include only two gate terminals. In some examples, the gate terminals 232(1)-232(N) may have a width of X nm and height of Y nm. In some examples, X may be greater than Y. In some examples, X is twice as great as Y. The distances between adjacent gate terminals 232(1)-232(N) may be the same as the width, which is X nm.

The gate terminals 232(1)-232(N) may be configured to control the conductive properties within the dielectric material 234 (e.g., InAs) and 235 (e.g., InGaAs) formed on the substrate 238 (e.g., InAlAs) to control the effective capacitance of the capacitive coupling element 230. The substrate 238 may have a height of W nm. Each of the gate terminals 232(1)-232(N) may be configured to receive a respective gate voltage VG1-VGN. Collectively, the respective VG1-VGN gate voltages may be selected to tune a particular effective capacitance of the capacitive coupling element 230 between the source/drain terminals 231(1)-232(2).

The dielectric material 234 and 235 may be buffered on each side by respective n+ regions 233 and air-gap regions 236. The air gap regions 236 may be in contact with the source/drain terminals 231(1), 231(2). The n+ region 233 may include highly doped n-type InAs. The n+ regions 233 may also be formed on the substrate 238, and may have a width of Z nm. The air-gap regions 236 may have a width of V nm. In some examples, V is less than Z. In some examples, Z is 3, 4, or 5 times greater than V. In some examples, X is four times greater than Z.

Specific, non-limiting examples of the capacitive coupling element are described herein. From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

Tunable Capacitor for Superconducting Qubits Using an InAs/InGaAs Heterostructure Adoption of fast, parametric coupling elements has improved the performance of superconducting qubits, enabling recent demonstrations of a quantum advantage in randomized sampling problems. The development of low loss, high contrast couplers is critical for scaling up these systems. We present a blueprint for a gate-tunable coupler realized with a two-dimensional electron gas in an InAs/InGaAs heterostructure. Our numerical simulations yield an on/off ratio of over two orders of magnitude. We give an estimate of the dielectric-limited loss from the inclusion of the coupler in a two qubit system.

I. Introduction

Tunable couplers for superconducting qubits, once a long-term investment in future quantum computers and a direction towards improving two-qubit gate fidelities [1,2], are now a centerpiece of large qubit arrays. The recent quantum supremacy demonstration [3] owes its success in part to the two-qubit gate fidelities across the chip facilitated by fast, tunable couplers. Frequently realized as a mutual inductance or effective capacitance between nearest-neighbor qubits and tuned by flux-biased superconducting quantum interference devices (SQUIDs), these couplers naturally integrate with both fixed and flux-tunable superconducting qubits [4].

Recent advancements in semiconductor-superconductor junctions as gate-tunable Josephson junctions have led to new proposals and realizations of coupling schemes to superconducting storage units [5] and readout buses [6]. Unlike their transmon [7] counterparts, these hybrid systems employ various III-V semiconductor materials with properties tunable in both fabrication and with external electric fields as opposed to the canonical, fixed fabrication $Al/Al_2O_3$ and Nb-based device stacks that rely on external current sources for tuning [8].

As with prior attempts to improve coherence with new materials, there are challenges in realizing high coherence gatemon [9] qubits, where an applied electric potential depletes a superconductor-semiconductor-superconductor junction. Recent dielectric loss studies of III-V materials, specifically Al/GaAs/Al trilayers, suggest that the piezoelectricity of GaAs can contribute to higher losses compared to sapphire or silicon substrates [10,11]. Apart from the aforementioned experimental results for GaAs, there have been no other studies to our knowledge that have measured the loss in III-V materials at single photon powers and millikelvin temperatures.

To address both issues of realizing a fast, tunable coupler and quantifying its potential as an additional source of dielectric loss, we propose the following. First, we propose a novel voltage-controlled capacitive coupling element between neighboring superconducting qubits. Composed of a pair of fixed air-gap capacitors and a single, effective capacitance tuned by a collection of metal-oxide gates that deplete a two dimensional electron gas (2DEG) in an InAs/InGaAs semiconductor heterostructure, the coupler is a potential replacement for SQUID-based inductive couplers [12].

Air-gap capacitors isolate the tuning elements, namely the gates, from the qubits, minimizing stray electric fields on the neighboring qubits. This is an improvement over the SQUID-based couplers, where stray magnetic fields can lead to classical cross-talk between qubits [13]. We suspect that the 2DEG coupler will introduce more charge noise than the inductive couplers, though transmon qubits are first order insensitive to charge noise and we focus on their integration with such qubits [7].

To resolve the latter issue of quantifying the dielectric loss Introduced by the 2DEG coupler, we performed measurements of microwave conductivity at single photon powers and millikelvin temperatures.

The structure of the paper is as follows. In Section II, we outline our numerical models of the 2DEG coupler, starting with semiconductor electron density calculations, then detailing our numerical models for dielectric loss. Section III provides ANSYS HFSS simulations of a prototypical two transmon qubit circuit coupled to a lumped impedance representing the 2DEG coupler. Here, we compute the lowest order electromagnetic eigenmodes of the device and apply energy participation ratio techniques to extract the Hamiltonian matrix elements in the dispersive regime. We extend these calculations to extract the charge-charge matrix elements corresponding to the dominant capacitive interaction between the two transmon qubits mediated by the 2DEG coupler. Final discussions, observations, and a summary of results are given in Section IV.

II. Coupler Modeling

A. Semiconductor 2DEG Calculations

As a first step In estimating the capacitance of the 2DEG coupler, we computed the electron concentration in COMSOL Multiphysics with the Semiconductor Module [14]. Equilibrium solutions to the drift-diffusion equations with Fermi-Dirac statistics revealed regions of high depletion under the gates when applying negative voltages on the order of a few volts, overcoming the barrier of the Au electrode on $SiO_2$ (2.98 eV) [15].

We modeled the InGaAs/InAs/InGaAs heterostructure by specifying electron and hole effective conduction band masses $m_{n(p),c}^*$, low-field mobilities $\mu_{N(O)}^{lf}$, band gap energies $E_g$, conduction band offsets $\Delta E_c$ between neighboring semiconductors, dielectric constants $\varepsilon_r$, and effective densities of states for the conduction and valence bands $N_{c(v)}$. Taking the electron affinity $\chi$ for InAs as given from the COMSOL material library, we calculated the remaining affinities using Anderson's affinity rule [16].

TABLE I

Materials parameters used in the
COMSOL Semiconductor Module calculations

| | InAs | InGaAs | INAIAs |
|---|---|---|---|
| $E_g$ [eV] | 0.354 | 0.473 | 0.752 |
| $\Delta E_c$ [eV] | — | 0.200 | 0.201 |
| $\varepsilon_r$ | 15.15 | 14.03 | 13.13 |
| $N_{c(v)}$ [cm$^{-3}$] | 6.6e18 (8.73e16) | 1.4e17 (6.4e18) | 2.1e17 (7.8e18) |
| $\chi$ [eV] | 4.9 | 4.7 | 4.5 |

TABLE I-continued

Materials parameters used in the
COMSOL Semiconductor Module calculations

| | InAs | InGaAs | INAIAs |
|---|---|---|---|
| $\mu_{n(p)}^{lf}$ [cm$^2$ V$^{-1}$ s$^{-1}$] | 14.4e3 (500) | 14.4e3 (450) | 14.e3 (384) |
| $m_{n(p),c}^*$ [m$_0$] | 0.023 (1.00) | 0.03 (0.25) | 0.04 (0.31) |

Table I gives a summary of the materials parameters used in the semiconductor simulations. InGaAs and InAlAs abbreviate $In_{0.81}Ga_{0.19}As$ and $In_{0.81}Al_{0.19}As$; $m_0$ corresponds to the rest mass of an electron 0.511 MeV c$^{-2}$. Out-of-plane effective electron and hole masses of InAs are set to $m_0$ in the model to simulate 2DEG confinement. Electron mobilities for InAs, InGaAs, and InAlAs are all set to the same value extracted from measurements of a similar device at millikelvin temperatures [17]. See Annex A for detailed calculations of the $In_xGa_{1-x}As$ and $In_xAl_{1-x}As$ parameters as a function of the compositional parameter (x).

Figure 3:
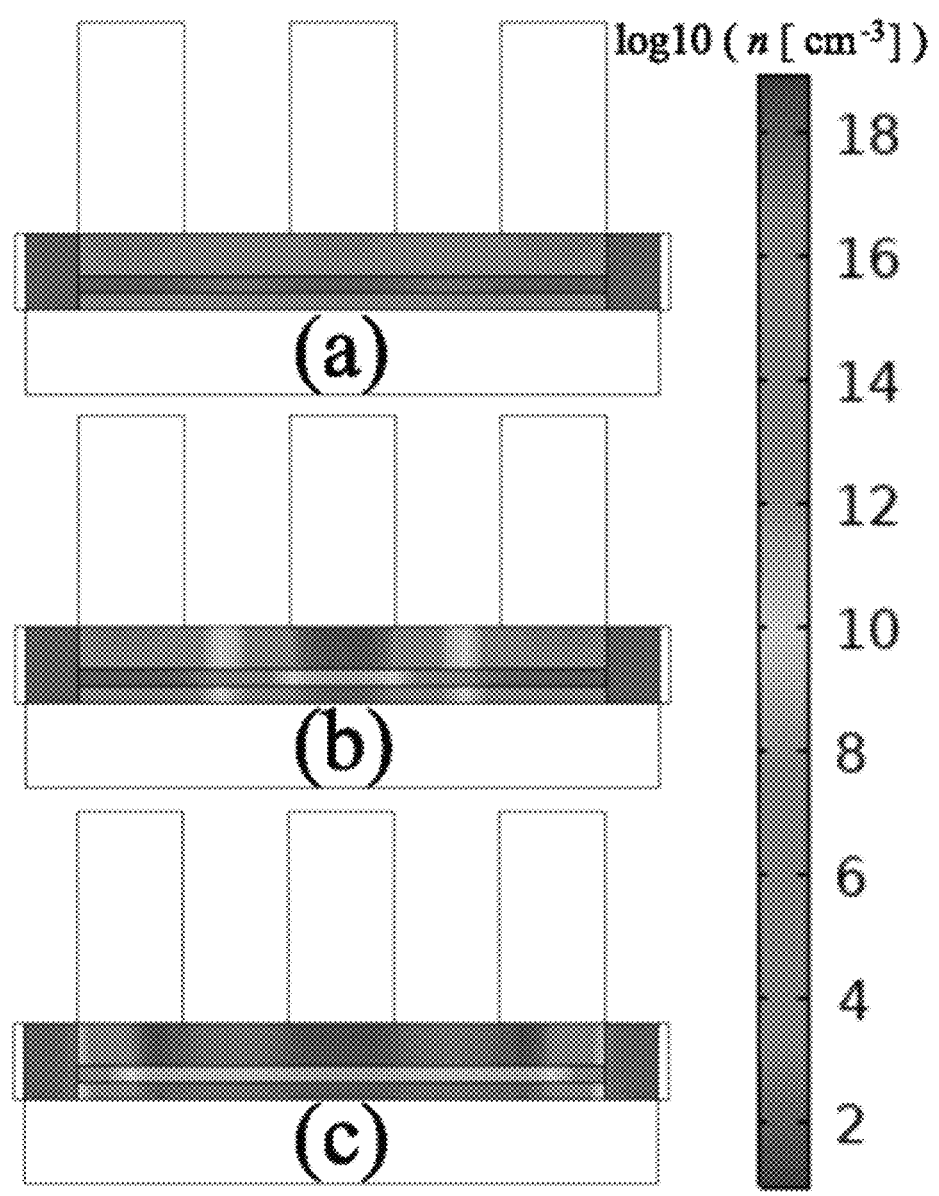
FIG. 3 shows electron concentrations on a logarithmic scale with source-drain bias for fully conducting and fully depleted operating points, and for the fully depleted limit with all gates biased.

FIG. 3 shows electron concentrations [cm$^{-3}$] on a base-10 logarithmic scale with source-drain bias $V_{sd}$=+5 mV−(−5 mV)=10 mV for (a) the fully conducting $V_g$=0 V and (b) fully depleted $V_g$=−3 V operating points, with $V_g$ applied to the center gate and the other two gates grounded; and (c) electron concentrations for the fully depleted limit with all gates biased to −3 V. The electron concentration is absent in the regions where we applied the Electric Charge Conservation equations without solving for n, i.e. in the $SiO_2$, InAlAs. and air regions. The vertical axis scales by a factor of four relative to the horizontal.

In setting up our electron concentrations calculations, we input the geometry in FIG. 2 using the native COMSOL CAD editor. Next, we assigned material properties to each domain using the values from Table I. Source and drain contacts in FIG. 1 were modeled as ideal ohmic contacts, while the gates were ideal Schottky contacts with a barrier height q$\phi_B$=2.98 eV for Au on $SiO_2$ [15]. Terminal labels follow the conventions established in FIG. 1 for the node voltages V1, V2 and VG1-VGN.

We selected the density gradient discretization scheme [18] in COMSOL to accurately model the quantum confinement effects in the 2DEG without resorting to a self-consistent Schrödinger-Poisson equation calculation. The density gradients modify the equilibrium electron (n) and hole (p) concentrations as [14]

$$n = N_c F_{1/2}\left(\frac{E_{fn} - E_c + qV_n^{DG}}{k_B T}\right) \quad (1)$$

$$p = N_c F_{1/2}\left(\frac{E_v - E_{fp} + qV_p^{DG}}{k_B T}\right) \quad (2)$$

$$N_{c(v)} = \left(\frac{2m_{n(p)}^* \pi k_B T}{h^2}\right)^{3/2}, \quad (3)$$

where $E_{c(v)}$ is a given material's conduction (valence) band edge, $E_{fn(p)}$ are the electron (hole) quasi-Fermi level energies. $F_{1/2}(\eta)$ is the Fermi-Dirac integral [19], $k_B$ is Boltzmann's constant, T is the temperature of the system, and q is the charge on the electron or hole.

We define the quantum potentials $V_{n(p)}^{DG}$ in terms of the density gradients [14]

$$\nabla \cdot (b_n \nabla \sqrt{n}) = \frac{1}{2}\sqrt{n} V_n^{DG} \qquad (4)$$

$$\nabla \cdot (b_p \nabla \sqrt{p}) = \frac{1}{2}\sqrt{p} V_p^{DG}, \qquad (5)$$

with the density gradient tensors $b_{n(p)}$ for electrons (holes) expressed in terms of the effective mass tensors $m^*_{n(p)}$ $$b_n = \frac{\hbar^2}{12q}[m_n]^{-1} \qquad (6)$$

$$b_p = \frac{\hbar^2}{12q}[m_p]^{-1}. \qquad (7)$$

Note the distinction between the scalar effective masses $m^*_{n(p)}$ and, the effective mass tensors $m^*_{n(p)}$. Anisotropy in the effective mass tensors allows us to model the quantum confinement of the 2DEG by constraining electron movement to one plane.

For the remaining materials, InAlAs, $SiO_2$, and air, we used the Electric Charge Conservation interface, only adding the following constitutive relations for the dielectric in terms of the electric permittivity tensor $\varepsilon$ for each material [14]

$$D = \varepsilon_0 \varepsilon E, \qquad (8)$$

where D is the electric displacement field, $\varepsilon_0$ is the permittivity of free space, and E is the electric field. By modeling these regions as pure dielectrics, we reduce some of the computational cost of our simulations and correctly model the pure dielectrics, e.g. air and oxide layers.

B. Electrostatic Capacitance Matrix Calculations

Following the semiconductor calculations described in the previous section, we developed a simplified model to extract the capacitance and conductance matrices. This simplified model replaced regions with high electron concentration with perfect electric conductors and regions with low electron concentration with pure dielectrics. The COMSOL Electrostatics Interface defines the Maxwell Capacitance Matrix C in terms of the charges and voltages on each node of an N-terminal network as [20]

$$\begin{pmatrix} Q_1 \\ Q_2 \\ \vdots \\ Q_N \end{pmatrix} = \begin{pmatrix} C_{11} & C_{12} & \ldots & C_{1N} \\ C_{21} & C_{22} & \ldots & C_{2N} \\ \vdots & \vdots & & \vdots \\ C_{N1} & C_{N2} & \ldots & C_{NN} \end{pmatrix} \begin{pmatrix} V_1 \\ V_2 \\ \vdots \\ V_N \end{pmatrix}, \qquad (9)$$

where $Q_i$ and $V_i$ are the charges and voltages on the i-th terminal.

The charges and voltages follow from solutions to Poisson's equation, and the charge continuity equation. In two dimensions these equations combine to give [20]

$$-\nabla \cdot d(\varepsilon_0 \nabla V - P) = \rho, \qquad (10)$$

where V is the electric potential. P is the polarization vector, p is the space charge density, and d is the out-of-plane thickness. This model is an approximation of the electron densities from the two-dimensional semiconductor interface calculations from the previous section, with d=5 μm.

We set the boundaries of domains representing perfect electric conductors as floating potential boundary conditions and define terminals as ohmic contacts on the corresponding dielectrics in FIG. 2, the schematic of the device as modeled in COMSOL multi-physics [20], Regions labeled n+ refer to highly doped n-type InAs, $\varepsilon_D$ (236) refers to air-gapped regions, and 231(1), 232(2) are the source/drain terminals. Gold electrodes deposited on $S_iO_2$ define the gate terminals 232(1)-232(N). We scaled the vertical dimensions by factor of four relative to the horizontal to enhance the InGaAs/InAs active region. Not shown or modeled is a several micron thick InP substrate.

Figure 4:
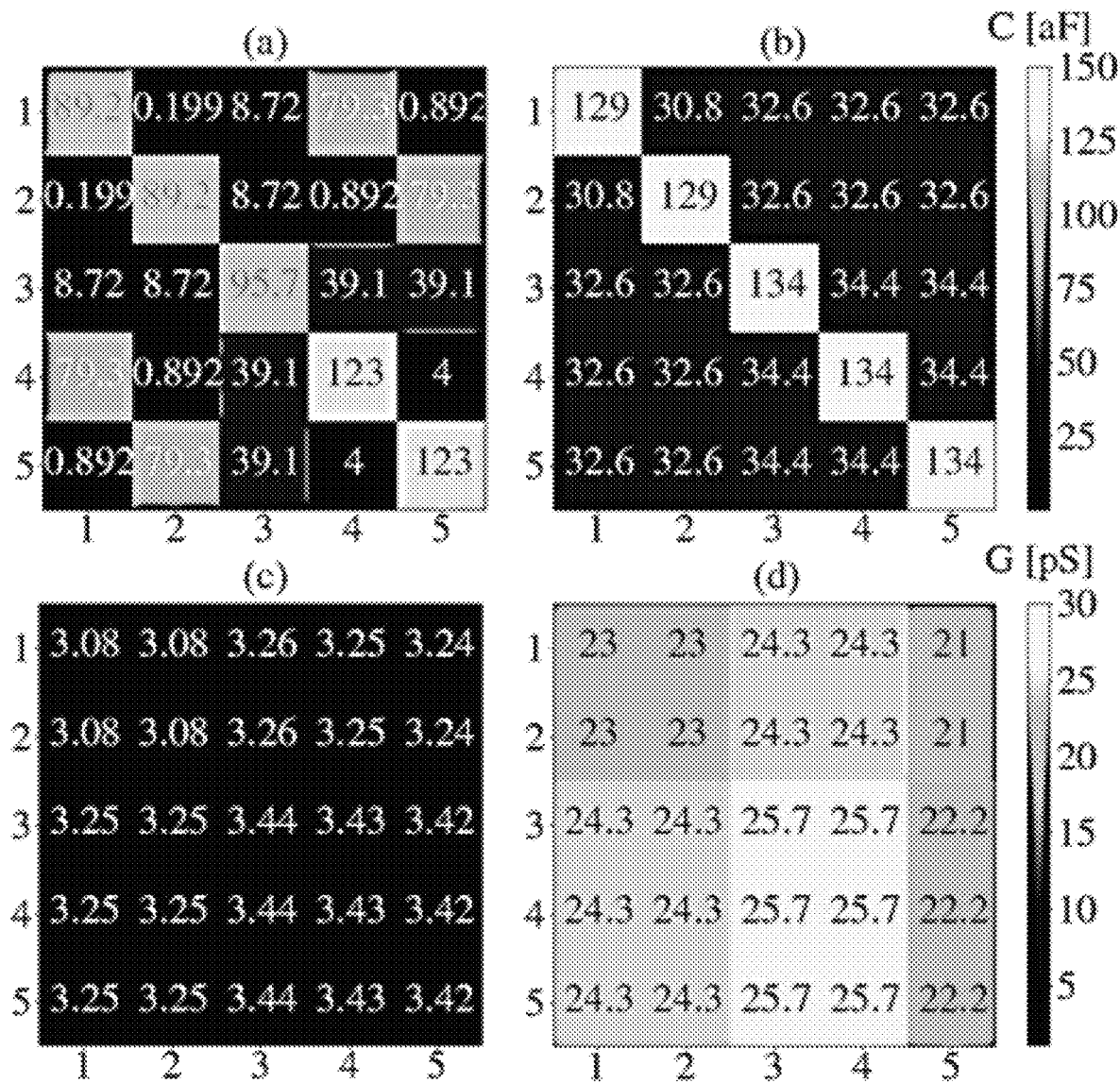
FIG. 4 shows capacitance and conductance matrices computed for fully depleted and fully conducting states.

In the fully conducting and depleted limits ($V_g=0$ V and $V_g=-3$ V), we computed the capacitance matrices in FIGS. 4 (a) and (b). The matrix elements of interest, $C_{12}=C_{21}$ represent the effective capacitance between the source and drain terminals. These terminals form capacitive contacts with any pair of qubits. The tuning ratio r, or on/off contrast of the 2DEG coupler is given by $r = C_{12,conducting}/C_{12,depleted} \approx 160$.

C. Electric Currents Admittance Matrix Calculations

To extract the conductance and verify the capacitance of the device, we used the AC/DC Electric Currents Interface, computing the admittance matrix Y defined in terms of the N terminal voltages $V_i$ and currents $I_i$ [20]

$$\begin{pmatrix} V_1 \\ V_2 \\ \vdots \\ V_N \end{pmatrix} = \begin{pmatrix} Y_{11} & Y_{12} & \ldots & Y_{1N} \\ Y_{21} & Y_{22} & \ldots & Y_{2N} \\ \vdots & \vdots & & \vdots \\ Y_{N1} & Y_{N2} & \ldots & Y_{NN} \end{pmatrix} \begin{pmatrix} I_1 \\ I_2 \\ \vdots \\ I_N \end{pmatrix} \qquad (11)$$

In the frequency domain, the voltages and currents become phasors of the form $\tilde{V}e^{i\omega t}$ and $\tilde{I}e^{i\omega t}$, with the admittance matrix given by $$Y = G + i\omega C, \qquad (12)$$

where G and C are the conductance and capacitance matrices. $i=\sqrt{-1}$, and $\omega$ is the angular frequency [20], Both matrices are symmetric for our linear, five-terminal device in FIG. 4 (a)-(d), in general, these matrices they need not be symmetric, e.g. some nonlinear networks such as circulators have nonreciprocal admittance matrices. In the linear case, the Electric Currents Interface in COMSOL computes the currents and voltages in Eq. (11) by solving the time harmonic equations [20]

$$\nabla \cdot (\sigma E + J_e) + i\omega \rho = 0, \qquad (13)$$

$$\nabla \cdot D = \rho, \qquad (14)$$

where E is the electric field, $J_e$ is the externally generated electric current density, $\sigma$ is the electrical conductivity, and p is the electric space charge density. We applied the same approach as in the electrostatic calculations, extracting the conductance matrix in the fully depleted and conducting limits of the device.

D. Dielectric Loss Model
1. TLS Loss Model
2. Estimation of Total Loss from Participation Ratios Following the procedure developed by [21] and recently by [22], we write the relaxation time $T_1$ at a given angular frequency $\omega$ as a function of the dielectric materials properties and geometric factors [22]

$$T_1^{-1} = \frac{\omega}{Q} = \omega \sum_j \frac{p_j}{Q_j} + \Gamma_0 \qquad (15)$$

-continued $$Q_j^{-1} = \tan \delta_j \tag{16}$$

$$p_j = \frac{t_j \int_{S_j} \varepsilon_0 \varepsilon_{1,j} |E|^2 dS}{W_e} \tag{17}$$

where $W_e$ is the electric field energy density for the entire geometry S, $Q_i$ are the quality factors, $\tan \delta_j$ are the loss tangents, $\varepsilon_{1,j}$ are the real parts of the dielectric function, $p_j$ are the participation ratios, and $t_j$ are the thicknesses of the layers associated with the j-th surface $S_j$.

The participation ratios give the fraction of the electrical energy stored in a given surface $S_j$ relative to the total electrical energy stored in the entire device geometry, i.e. $S=\cup jS_j$. The last term in Eq. (15), $\Gamma_0$, includes all other loss mechanisms contributing to $T_1$ besides dielectric loss [22], Note, these participation ratios differ from those referred to in subsequent calculations involving energy participation ratios corresponding to a given mode rather than a particular surface.

TABLE II

Participation ratios $p_j$, dielectric loss tangents $\tan\delta_j$, layer thicknesses $t_j$, and estimated dielectric-loss-limited $T_{1,j}$

|  | $t_j$ [nm] | $p_j$ | $\tan \delta_j$* | $T_1$ [μs] |
|---|---|---|---|---|
| InGaAs (Top) | 10 | 2.08E−5 | 4.8E−5 | 3190 |
| InAs | 4 | 3.18E−5 | 4.8E−5 | 20800 |
| InGaAs (Bottom) | 4 | 2.86E−5 | 4.8E−5 | 23200 |
| InAlAs | 20 | 5.64E−4 | 4.8E−5 | 1180 |
| SiO$_2$ [23] | 50 | 4.44E−3 | 2.00E−5 | 3.58 |
| Total |  |  |  | 3.57 |

Table II gives participation ratios $p_j$, dielectric loss tangents $\tan \delta_j$, layer thicknesses $t_j$, and estimated dielectric-loss-limited $T_{1,j}$. All $T_{1,j}$ times referenced to a qubit frequency of $\omega/2\pi=5$ GHz and $\tan \delta_j$* indicates that in the absence of reliable loss tangent data for InAs, InGaAs, and InAlAs, we used the power-independent loss lower bound for GaAs at 12 mK as a best estimate [10].

III. Integration with Circuit QED

A. Two Qubit Coupler

Figure 5:
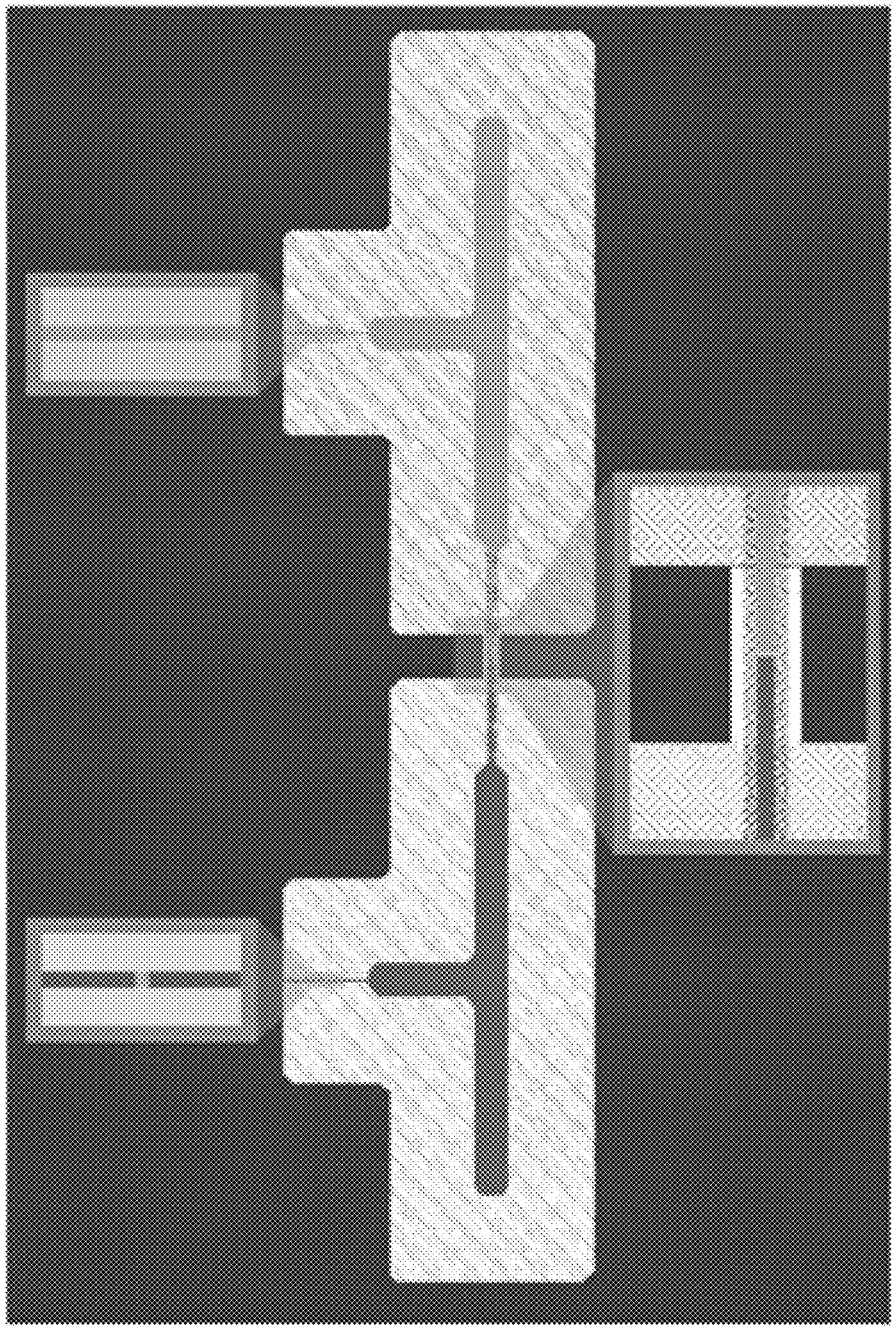
FIG. 5 is a false color geometry image of two transmon qubits with a capacitive coupler.

FIG. 5 is a false color geometry image of two transmon qubits with the capacitive coupler in between used in the HFSS simulations. Lumped impedances defined in the gold regions of the insets, represent the linear response of the Josephson junctions and capacitive coupling element in the HFSS model.

In FIG. 5 we have a microwave circuit model of two transmon qubits coupled by a lumped impedance $Z_{JJc}(\omega)=(R^{-1}+i\omega C)^{-1}$, where R and C take the values of $R_{12}$ and $C_{12}$ in either the fully conducting or fully depleted limits of the 2DEG coupler.

Figure 6:
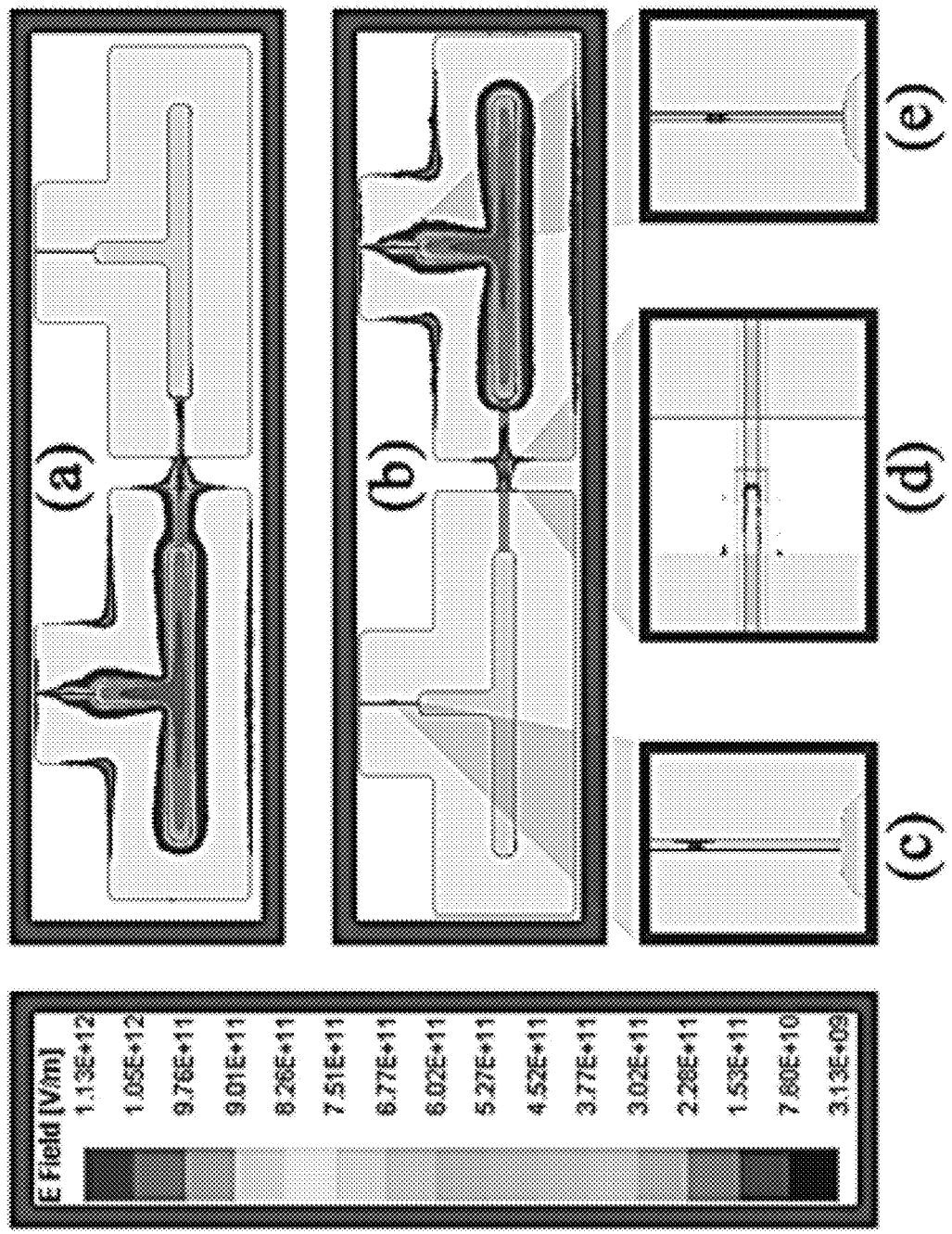
FIG. 6 illustrates an electric field norm for eigenmode solutions.

FIG. 6 illustrates the electric field norm for the first three eigenmode solutions computed with HFSS: (a) 5.9 GHz, (b) 6.1 GHz, and (c-e) 8.6 GHz, and magnified views of (c) qubit 1, (d) coupling element, and (e) qubit 2 electric field intensities for the third mode in the fully depleted limit of the coupler. Using ANSYS Electronics Desktop (formerly HFSS), we computed the lowest electromagnetic eigenmodes of the device with the other two qubits defined as parallel LC Impedances, $Z_{JJi}=((i\omega L_i)^{-1}+i\omega C_i)^{-1}$. In the following section, we use these eigenmode solutions to estimate the Hamiltonian matrix elements corresponding to qubit-qubit mode and qubit-coupler mode coupling strengths. We will differentiate between this modal coupling and direct capacitive coupling in the final part of this section, where we calculate the direct charge-charge interaction matrix elements.

B. Energy Participation Ratios and Quantization

To extract the coupling matrix elements between the qubits in our microwave device layout, we employ the energy participation ratio (EPR) method developed by Minev [24]. This approach goes beyond the larger family of black box quantization methods, where the Hamiltonian describing a collection of Josephson junction-based qubits interacting with any number of harmonic modes separates into linear and nonlinear terms [25,26].

One can relate the modal decomposition of the classical electromagnetic response, e.g. impedance, admittance, or electromagnetic energies, with the linear and nonlinear parts of the Hamiltonian. Additional inputs describing the Josephson junction energy scales, $E_J$ and $E_C$, complete the model. The total Hamiltonian, accounting for M modes, under the rotating wave approximation, reads $$H = H_{lin} + H_{nl} \tag{18}$$

$$H_{lin}/\hbar = \sum_{m=1}^{M} \omega_m a_m^\dagger a_m \tag{19}$$

$$H_{nl}/\hbar = -\sum_{m=1}^{M}\left(\Delta_m a_m^\dagger a_m + \frac{1}{2}a_m a_m^{\dagger 2} a_m^2\right) + \frac{1}{2}\sum_{m\neq n}\chi_{mn} a_m^\dagger a_m a_n^\dagger a_n, \tag{20}$$

where we define the Lamb shifts $\Delta_m$, cross-Kerr coefficients $\chi_{mn}$, and anharmonicities $\alpha_m$ as [24]

$$\Delta_m = \frac{1}{2}\sum_{n=1}^{M} \chi_{mn} \tag{21}$$

$$\chi_{mn} = -\sum_{j\in J} \frac{1}{2}\frac{\hbar \omega_m \omega_n}{4E_{J_j}} \tag{22}$$

$$\alpha_m = \frac{1}{2}\chi_{mm}. \tag{23}$$

Table III gives a summary of the cross- and self-Kerr (an-harmonicities) coefficients along with the three lowest electromagnetic modes of the device as extracted with the pyEPR Python package [24,27]. The eigenfrequencies and quality factors in the first two columns of Table III follow from the HFSS eigenmode solutions. Diagonal entries of x are scaled by ½ to denote the anharmonicities from Eq. (23).

TABLE III

Extracted matrix elements from energy participation ratio calculations for values of $R_{12}$, $C_{12}$ in the fully depleted (d) and fully conducting(c) limits of the 2DEG

| Mode Index | $\omega/2\pi$ [GHz] | Q | $\chi/2\pi$ [MHz] | | |
|---|---|---|---|---|---|
| 1 (d) | 5.667 | 4.5E8 | 226 | 62.5 | 0.965 |
| 2 (d) | 5.838 | 1.3E9 | 62.5 | 226 | 1.11 |
| 3 (d) | 8.614 | 1.8E13 | 0.965 | 1.11 | 0.002 |
| 1 (c) | 5.669 | 4.5E8 | 223 | 67.1 | 0.974 |
| 2 (c) | 5.840 | 1.3E9 | 67.1 | 223 | 1.12 |
| 3 (c) | 8.612 | 1.8E13 | 0.974 | 1.12 | 0.002 |

C. Extraction of the Exchange Interaction

To compute a more precise estimate of the charge-charge interaction between the transmon qubits in our HFSS model, we consider the capacitance matrix associated with a persistent current or flux qubit following the derivation by Orlando et al. [28]. For details on the derivation of the capacitance matrix, see Annex B. The Hamiltonian for the coupled two transmons, written in terms of the Josephson junction phases (p; and node charges $Q_i$, is given by $$H = \frac{1}{2}Q^T C^{-1} Q + U(\varphi) \tag{24}$$

$$U(\varphi) = \sum_j E_{J_j}(1 - \cos \varphi_j) \tag{25}$$

$$C = \begin{pmatrix} C_1 + C_3 & -C_3 \\ -C_3 & C_2 + C_2 \end{pmatrix}. \tag{26}$$

Eq. (24) gives the charge-charge matrix elements as one half the entries of the inverse of the capacitance matrix, $C^{-1}/2$. We numerically inverted C in Eq. (26) using values for $C_1$, $C_2$ obtained from Eq. (B6) and $C_3=C_{12}(V_g)$ in the depleting and conducting limits.

FIG. 4 shows a capacitance matrix computed with the COMSOL electrostatics interface for (a) the fully depleted and (b) fully conducting limits of the 2DEG, and a conductance matrix computed with the COMSOL electric currents interface for (c) the fully depleted and (d) fully conducting limits of the 2DEG. Vertical and horizontal axes labels correspond to terminal Indices in FIG. 1. The tuning ratio between the conducting and depleted 2DEG is given by $r=C_{12,conducting}/C_{12,depleted}\approx 160$.

Table IV summarizes these results, reproducing the tuning ratio observed in FIG. 4, r≈160. Table IV gives charge-charge (exchange) interaction matrix elements in the (d) depleting and (c) conducting limits of the 2DEG coupler.

TABLE IV

Charge-charge (exchange) interaction matrix elements in the (d) depleting and (c) conducting limits of the 2DEG coupler

| Qubit Index | Matrix Elements | [MHz] |
| --- | --- | --- |
| 1 (d) | 226 | 0.0005 |
| 2 (d) | 0.0005 | 226 |
| 1 (c) | 226 | 0.079 |
| 2 (c) | 0.079 | 226 |

We emphasize here that the off-diagonal charge-charge interaction matrix elements give a more accurate description of the coupling between the qubits mediated by the 2DEG coupler than the EPR calculations. Although the energy scale for the coupling is small relative to the anharmonicities, this is a desirable feature, as the coupling is dominated by the small, tunable capacitance $C_{12}$.

IV. Conclusion

We simulated a 2DEG-based, voltage-controlled tunable coupler compatible with superconducting qubits. The estimated tuning ratio of ≈160 and high impedance of the off state, serve as an excellent candidate for coupling qubits. Our HFSS simulations and subsequent capacitance matrix inversion analysis suggest that the coupling matrix elements exhibit the same range of tunability and loss estimates show the gate dielectric limits the coherence of the qubit, not the ill-V semiconductors. These results, coupled with the benefit of second order compared with first order sensitivity to charge noise rather than flux noise, give us confidence that voltage-controlled coupling elements of the form developed here have the potential to supplant their inductive counterparts as the de facto coupler-of-choice in superconducting qubit systems.

ANNEX A. III-V Ternary Alloy Parameter Calculations

Following the standard linear and quadratic interpolation schemes for III-V ternary alloys $A_xB_{1-x}C$, with composition parameter x and in terms of experimentally measured values of their binary constituents, AB and BC, we have the lattice constant α, energy gap $E_g$, and effective mass at the Γ point $m^{\Gamma*}$ as [29]

$$a_{A_1B_{1-x}C} = xa_{AC} + (1-x)a_{BC}, \tag{A1}$$

$$E_{A_XB_{1-X}C} = xE_{AC} + (1-x)E_{BC} + x(1-x)E_{AB}, \tag{A2}$$

$$m^{\Gamma*}_{A_XB_{1-X}C} = xm^{\Gamma}_{AC} + (1-x)m^{\Gamma}_{BC} + x(1-x)m^{\Gamma}_{AB}. \tag{A3}$$

Similarly, the hole effective masses follow from a quadratic interpolation scheme of the AB, AC binary components as computed from a spherical band approximation of the valence band edge [29]

$$m_{p,dos} = \left(m_{th}^{3/2} + m_{hh}^{3/2}\right)^{2/3}, \tag{A4}$$

$$m_{p,c} = \frac{m_{th}^{5/2} + m_{hh}^{5/2}}{m_{p,dos}}, \tag{A5}$$

$$m_{p,c,A_XB_{1-X}C} = xm_{p,c}AC + (1-x)m_{p,c,BC}, \tag{A6}$$

$$m_{p,dos,A_XB_{1-X}C} = xm_{p,dos,AC} + (1-x)m_{p,dos,BC}. \tag{A7}$$

We recognize that the spherical band approximation may not apply to the Ill-V materials in our study, but it gives an estimate for density of states and conduction band effective masses that are inputs to the COMSOL Semiconductor Module materials models.

To estimate the conduction band offsets between the $In_xAl_{1-x}As$ and $In_xGa_{1-x}As$ layers, we followed another interpolation scheme that computes the absolute duction band edges $E_c$ directly [30]

$$E_c = E_{v,avg} + \frac{\Delta_0}{3} + E_g + \Delta E_c^{hy}, \tag{A8}$$

$$\Delta E_c = E_c^B - E_c^A, \tag{A9}$$

where $E_{v,avg}$ is the average valence band edge, $\Delta_0$ is the spin-orbit splitting in the absence of strain, $E_g$ is the band gap energy, and $\Delta E_c^{hy}$ is the shift of the conduction band edge due to hydrostatic strain.

These parameters are calculated from the following expressions with coefficients $C_{ij}$ read-off from Table Ill compiled by Krijn [30]

$$E_{v,avg} = \sum_{i=1}^{2} C_{i0}(E_{v,avg})x^i, \tag{A10}$$

$$\Delta_0 = \sum_{i=1}^{2} C_{i0}(\Delta_0)x^i, \tag{A11}$$

-continued $$\Delta E_c^{hy} = \frac{\Delta a(x)}{a(x)} \sum_{i=0}^{1} C_{i0}(\Delta E_c^{hy}) x^i, \quad \text{(A12)}$$

$$\Delta a(x) = a_0 - a(x). \quad \text{(A13)}$$

Annex B. Charge Matrix Derivation

Figures 7A, 7B:
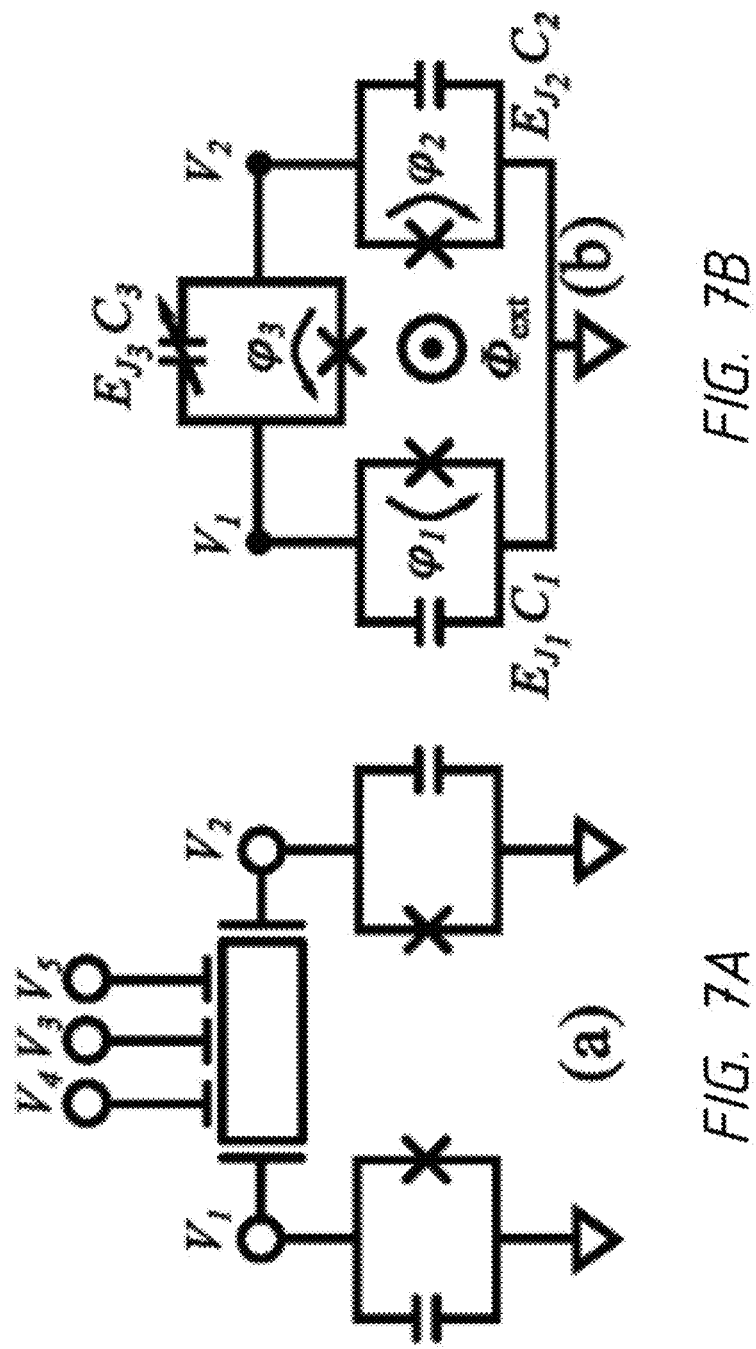
FIGS. 7A and 7B illustrate a circuit model for a total 2DEG coupler with gates and a pair of transmon qubits, compared with a simplified circuit used in derivation of the charge matrix.

FIGS. 7A and 7B illustrate a circuit model for (FIG. 7A) the total 2DEG coupler with gates and a pair of transmon qubits, compared with (FIG. 7B) the simplified circuit used in the derivation of the charge matrix. The directions of the phases across the Josephson junctions are consistent with the conventions chosen by Orlando et al. for ease of comparison [28]. The labeling of the voltage nodes $V_i$ is used where nodes 1 and 2 correspond to source and drain terminals, and nodes 3-5 refer to the gate terminal.

Starting from the two transmon circuit coupled by a voltage-controlled Josephson junction (our 2DEG coupler) in FIG. 7B, with phases $\phi 1$, $\phi 2$, $\phi 3$ referring to the left, right, and coupling junctions, respectively, we have [28]

$$\varphi_1 - \varphi_2 + \varphi_3 = -2\pi \Phi_{ext}/m \quad \text{(B1)}$$

where $\phi_{ext}$ is the flux threading the loop formed by the three Josephson junctions as in a typical flux qubit circuit.

For finite $\phi_{ext}$, the potential energy U is given by $$U(\varphi) = \sum_j E_{J_i}(1-\cos\varphi_j) = \quad \text{(B2)}$$

$$E_{J_1}(1-\cos\varphi_1) + E_{J_2}(1-\cos\varphi_2) + E_{J_3}(1-\cos(\varphi_2 - \varphi_1 + 2\pi\Phi_{ext})),$$

with the signs on the phases following FIG. 7B, preserving the conventions chosen in [28] and we order the phases in a single column vector as $$\varphi = \begin{pmatrix} \varphi_1 \\ \varphi_2 \end{pmatrix}, \quad \text{(B3)}$$

Setting $\phi_{ext}=0$, we compute the kinetic energy T by using the Josephson equation relating the voltages at nodes with $k=\{1, 2\}$, $V_k=(\phi_0/2\pi)\dot\phi_k$ and the definition of T in terms of $\dot\phi_k$ $$T = \frac{1}{2}(C_1 V_1^2 + C_2 V_2^2 + C_3 V_3^2) = \quad \text{(B4)}$$

$$\frac{1}{2}(C_1\dot\varphi_1^2 + C_2\dot\varphi_2^2 + C_3(\dot\varphi_2 - \dot\varphi_1)^2) = \frac{1}{2}\left(\frac{\Phi_0}{2\pi}\right)^2 \dot\varphi^T C \dot\varphi,$$

and reading off the capacitance matrix $$C = \begin{pmatrix} C_1 + C_3 & -C_3 \\ -C_3 & C_2 + C_3 \end{pmatrix}. \quad \text{(B5)}$$

Relating the total capacitances (both the intrinsic junction and external capacitance, commonly referred to as $C_\Sigma$ [31]) shunting the junctions, $C_1$, $C_2$, to the anharmonicities extracted from the EPR calculations, we have, from the asymptotic expressions derived by Koch et al. [7]

$$C_k = \frac{e^2}{2E_C} \approx -\frac{e^2}{2\alpha_k} \quad \text{(B6)}$$

and we take $C_3=C_{12}(V_g)$, the gate voltage-dependent capacitance across the 2DEG coupler.

The classical Lagrangian L and Hamiltonian H associated with the kinetic and potential energies above, then reads [28]

$$\mathcal{L}(\varphi, \dot\varphi) = T - U = \frac{1}{2}\left(\frac{\Phi_0}{2\pi}\right)^2 \dot\varphi^T C \dot\varphi - \sum_j E_{J_j}(1-\cos\varphi_j) \quad \text{(B7)}$$

$$\mathcal{H} = P^T \dot\varphi - \mathcal{L} = \frac{1}{2} Q^T C^{-1} Q + U(\varphi) \quad \text{(B8)}$$

$$P_i = \frac{\partial \mathcal{L}}{\partial \dot\varphi_i} = \left(\frac{\Phi_0}{2\pi}\right)^2 C \dot\varphi, \; Q = \frac{2\pi}{\Phi_0} P \quad \text{(B9)}$$

We take the form of the quantized Hamiltonian to be the same as the classical one in Eq. (B8) with classical variables promoted to operators, and identify the charge-charge matrix elements as $C^{-1}/2$.

REFERENCES

[1] Y. Lu, S. Chakram, N. Leung, N. Earnest, R. K. Naik, Z. Huang, P. Groszkowski, E. Kapit, J. Koch, and D. I. Schuster, "Universal stabilization of a parametrically coupled qubit," Phys. Rev. Lett. 119, 150502 (2017).

[2] Z. Huang, Y. Lu, E. Kapit, D. I. Schuster, and J. Koch. "Universal stabilization of single-qubit states using a tunable coupler," Phys. Rev. A 97, 062345 (2018).

[3] F. Arute, K. Arya, R. Babbush, D. Bacon, J. C. Bardin, R. Barends, R. Biswas, S. Boixo, F. G. S. L. Brandao, D. A. Buell, B. Burkett, Y. Chen, Z. Chen, B. Chiaro, R. Collins, W. Courtney, A. Dunsworth, E. Farhi, B. Foxen, A. Fowler, C. Gidney, M. Giustina, R. Graff, K. Guerin. S. Habegger, M. P. Harrigan, M. J. Hartmann, A. Ho. M. Hoffmann. T. Huang, T. S. Humble. S. V. Isakov, E. Jeffrey, Z. Jiang, D. Kafri, K. Kechedzhi, J. Kelly, P. V. Klimov, S. Knysh, A. Korotkov, F. Kostritsa, D. Landhuis, M. Undmark, E. Lucero, D. Lyakh, S. Mandrà, J. R. McClean, M. McEwen, A. Megrant, X. Mi, K. Michielsen, M. Mohseni, J. Mutus, O. Naaman, M. Neeley, C. Neill, M. Y. Niu, E. Ostby, A. Petukhov, J. C. Platt, C. Quintana, E. G. Rieffel, P. Roushan, N. C. Rubin, D. Sank, K. J. Satzinger, V. Smelyanskiy, K. J. Sung. M. D. Trevithick, A. Vainsencher, B. Villalonga, T. White, Z. J. Yao, P. Yeh, A. Zalcman, H. Neven, and J. M. Martinis, "Quantum supremacy using a programmable superconducting processor," Nature 574, 505-510 (2019).

[4] R. Barends, C. M. Quintana, A. G. Petukhov, Y. Chen, D. Kafri, K. Kechedzhi, R. Collins, O. Naaman, S. Boixo, F. Arute, K. Arya, D. Buell, B. Burkett. Z. Chen, B. Chiaro, A. Dunsworth, B. Foxen, A. Fowler, C. Gidney, M. Giustina, R. Graff, T. Huang, E. Jeffrey, J. Kelly, P. V. Klimov, F. Kostritsa, D. Landhuis, E. Lucero, M. McEwen, A. Megrant, X. Mi, J. Mutus, M. Neeley, C. Neill, E. Ostby. P. Roushan, D. Sank, K. J. Satzinger, A. Vainsencher, T. White, J. Yao, P. Yeh, A. Zalcman, H. Neven, V. N. Smelyanskiy, and J. M. Martinis, "Diabatic gates for frequency-tunable superconducting qubits," Phys. Rev. Lett. 123, 210501 (2019).

[5] K. Sardashti, M. C. Dartiailh, J. Yuan, S. Hart, P. Gumann, and J. Shabani, "Voltage-tunable superconducting resonators: a platform for random access quantum

[6] L. Casparis, N. J. Pearson, A. Kringhøj, T. W. Larsen, F. Kuemmeth, J. Nygård, P. Krogstrup, K. D. Petersson, and C. M. Marcus, "Voltage-controlled superconducting quantum bus," Phys. Rev. B 99, 085434 (2019).

[7] J. Koch, T. M. Yu, J. Gambetta, A. A. Houck, D. I. Schuster, J. Majer, A. Blais, M. H. Devoret, S. M. Girvin, and R. J. Schoelkopf, Charge-insensitive qubit design derived from the Cooper pair box," Phys. Rev. A 76, 042319 (2007).

[8] W. D. Oliver and P. B. Welander, "Materials In superconducting quantum bits," MRS Bulletin 38, 816-825 (2013).

[9] T. W. Larsen, K. D. Petersson, F. Kuemmeth, T. S. Jespersen, P. Krogstrup, J. Nygård, and C. M. Marcus, "Semiconductor-nanowire-based superconducting qubit," Phys. Rev. Lett. 115, (2015).

[10] C. R. H. McRae, A. McFadden, R. Zhao, H. Wang, J. L. Long, T. Zhao, S. Park, M. Bal, C. J. Palmstrøm, and D. P. Pappas, "Dielectric loss in epitaxial Al/GaAs/Al trilayers for superconducting circuits," arXiv e-prints, arXiv:2009.10101 (2020), arXiv:2009.10101 [physics.app-ph].

[11] M. Scigliuzzo, L. E. Bruhat, A. Bengtsson, J. J. Burnett. A. F. Roudsari, and P. Delsing, "Phononic loss in superconducting resonators on piezoelectric substrates," New Journal of Physics 22, 053027 (2020).

[12] W. Mayer, J. Yuan, K. S. Wickramasinghe, T. Nguyen, M. C. Dartiailh, and J. Shabani, "Superconducting proximity effect In epitaxial Al—InAs heterostructures," Applied Physics Letters 114, 103104 (2019), https://doi.org/10.1063/1.5067363.

[13] R. C. Bialczak, M. Ansmann, M. Hofheinz, M. Lenander, E. Lucero, M. Neeley, A. D. O'Connell, D. Sank, H. Wang, M. Weides, J. Wenner, T. Yamamoto, A. N. Cleland, and J. M. Martinis. "Fast Tunable Coupler for Superconducting Qubits," Phys. Rev. Lett. 106, 060501 (2011).

[14] "The Semiconductor Module User's Guide," https//doc.comsol.com/5.5/docserver/#!/com.comsol.help.semicond/html_SemiconductorModuleManual.html (2020).

[15] K. Hirabayashi, "Dielectric Theory of the Barrier Height at Metal-Semiconductor and Metal-Insulator Interfaces," Phys. Rev. B 3, 4023-4025 (1971).

[16] B. Streetman and S. Banerjee, "Energy bands and charge carriers in semiconductors," in *Solid State Electronic Devices* (Pearson, 2015) Chap. 5, pp. 238-243.

[17] K. S. Wickramasinghe, W. Mayer, J. Yuan, T. Nguyen, L. Jiao, V. Manucharyan, and J. Shabani, "Transport properties of near surface InAs two-dimensional heterostructures," Applied Physics Letters 113, 262104 (2018), https//doi.org/10.106311.5050413.

[18] M. G. Ancona, "Density-gradient theory: a macroscopic approach to quantum confinement and tunneling in semiconductor devices," Journal of Computational Electronics 10, 65-97 (2011).

[19] R. Kim, X. Wang, and M. Lundstrom, "Notes on Fermi-Dirac Integrals," (2019), arXiv:0811.0116 [cond-mat.mes-hall].

[20] "The AC/DC Module User's Guide," https://doc.comsol.com/5.5/docserver/#!/com.comsol.help.acdc/html_ACDCModuleManual.html (2020).

[21] J. Wenner, R. Barends, R. C. Bialczak, Y. Chen, J. Kelly, E. Lucero, M. Mariantoni, A. Megrant, P. J. J. O'Malley, D. Sank, A. Vainsencher, H. Wang, T. C. White. Y. Yin, J. Zhao, A. N. Cleland, and J. M. Martinis, "Surface loss simulations of superconducting coplanar waveguide resonators," Applied Physics Letters 99, 113513 (2011), https://doi.org/10.1063/1.3637047.

[22] C. Wang, C. Axline, Y. Y. Gao, T. Brecht, Y. Chu, L. Frunzio, M. H. Devoret, and R. J. Schoelkopf, "Surface participation and dielectric loss in superconducting qubits," Applied Physics Letters 107, 162601 (2015), https//doi.org/10.1063/1.4934486.

[23] D. Li, J. Gao, J. E. Austermann, J. A. Beall, D. Becker, H. Cho, A. E. Fox, N. Halverson, J. Henning, G C. Hilton, J. Hubmayr, K. D. Irwin, J. Van Lanen, J. Nibarger, and M. Niemack, "Improvements in Silicon Oxide Dielectric Loss for Superconducting Microwave Detector Circuits," IEEE Transactions on Applied Superconductivity 23, 1501204-1501204 (2013).

[24] Z. K. Minev, "Catching and Reversing a Quantum Jump Mid-Flight," (2019), arXiv:1902.10355 [quant-ph].

[25] S. E. Nigg, H. Paik, B. Vlastakis, G. Kirchmair, S. Shankar, L. Frunzio, M. H. Devoret, R. J. Schoelkopf, and S. M. Girvin, "Black-Box Superconducting Circuit Quantization," Phys. Rev. Lett. 108, 240502 (2012).

[26] F. Solgun, D. W. Abraham, and D. P. DVincenzo, "Blackbox quantization of superconducting circuits using exact impedance synthesis," Phys. Rev. B 90, 134504 (2014).

[27] Z. K. Minev, Z. Leghtas, S. O. Mundhada, L. Christakis, I. M. Pop, and M. H. Devoret, "Energy-participation quantization of Josephson circuits," arXiv e-prints, arXiv:2010.00620 (2020), arXiv:2010.00620 [quant-ph].

[28] T. P. Orlando, J. E. Mooij, L. Tian, C. H. van der Wal, L. S. Levitov, S. Lloyd, and J. J. Mazo, "Superconducting persistent-current qubit," Phys. Rev. B 60, 15398-15413 (1999).

[29] S. Adachi, "III-V Ternary and Quaternary Compounds," in *Springer Handbook of Electronic and Photonic Materials*, edited by S. Kasap and P. Capper (Springer International Publishing. Cham, 2017) pp. 725-741.

[30] M. P. C. M. Krijn, "Heterojunction band offsets and effective masses in Ill-V quaternary alloys," Semiconductor Science and Technology 6, 27-31 (1991).

[31] D. Schuster, *Circuit Quantum Electrodynamics*, Ph.D. thesis, Yale University (2007).

The invention claimed is:

1. An apparatus, comprising:
   a pair of qubits; and
   a capacitive coupling element coupled between the pair of qubits and comprising a plurality of gate terminals;
   wherein the capacitive coupling element is configured to receive a respective gate voltage at each of the plurality of gate terminals and to adjust a capacitance of the capacitive coupling element in response to the respective gate voltage received at each of the plurality of gate terminals, and
   wherein the capacitance of the capacitive coupling element is configured to control a coupling strength between the pair of qubits.

2. The apparatus of claim 1, wherein the capacitive coupling element includes a fixed air-gap capacitor.

3. The apparatus of claim 2, wherein the fixed air gap capacitor includes a source terminal and a doped n-type region separated by an air-gap region.

4. The apparatus of claim 3, wherein a width of the doped n-type region is greater than a width of the air-gap region.

5. The apparatus of claim 1, wherein the capacitive coupling element includes an Indium-Arsenide (InAs)/Indium Gallium Arsenide (InGaAs) semiconductor heterostructure.

6. The apparatus of claim 1, wherein the plurality of gate terminals includes at least three gate terminals.

7. The apparatus of claim 1, wherein a gate terminal of the plurality of gate terminals comprises a layer of silicon dioxide and a layer of gold.

8. The apparatus of claim 1, wherein a width of a gate terminal of the plurality of gate terminals is greater than a height of said gate terminal.

9. The apparatus of claim 1, wherein the capacitive coupling element is formed on a substrate.

10. The apparatus of claim 1, wherein the pair of qubits comprise a pair of transmon qubits.

11. The apparatus of claim 1, wherein the pair of qubits comprises a pair of flux qubits.

12. The apparatus of claim 1, wherein the pair of qubits are configured in a single, two-dimensional layer of a multi-qubit architecture.

13. The apparatus of claim 1, wherein the pair of qubits each comprise a respective one of different three-dimensional cavities of a multi-qubit architecture.

14. The apparatus of claim 1, wherein the capacitive coupling element is configured to adjust the capacitance of the capacitive coupling element in response to alternating-current (AC) fields to perform parametric operations.

15. The apparatus of claim 1, wherein the pair of qubits and the capacitive coupling element are included in a small logical qubit device.

16. The apparatus of claim 1, wherein at least one of the pair of qubits comprises a solid-state qubit.

17. The apparatus of claim 1, wherein the capacitive coupling element is configured to adjust the capacitance of the capacitive coupling element to route a signal between the pair of qubits.

18. The apparatus of claim 1, wherein at least one of the pair of qubits comprises a cavity.

19. The apparatus of claim 1, wherein at least one of the qubits comprises a two-dimensional or three-dimensional cavity of another of the pair of qubits.

\* \* \* \* \*